United States Patent [19]

vor der Brück et al.

[11] 4,180,503

[45] Dec. 25, 1979

[54] ACID DISAZO DYESTUFFS CONTAINING A SUBSTITUTED THIOPHENE MIDDLE COMPONENT

[75] Inventors: Dieter vor der Brück, Cologne; Gerhard Wolfrum, Bergisch-Neukirchen, Fed. Rep. of Germany

[73] Assignee: Bayer Aktiengesellschaft, Leverkusen, Fed. Rep. of Germany

[21] Appl. No.: 612,318

[22] Filed: Sep. 11, 1975

[30] Foreign Application Priority Data

Sep. 11, 1974 [DE] Fed. Rep. of Germany ....... 2443485

[51] Int. Cl.$^2$ ...................... C09B 31/14; C09B 31/04; C09B 31/06; C09B 31/08

[52] U.S. Cl. .................................... 260/152; 260/156; 260/157; 260/158; 260/160; 260/165

[58] Field of Search ............... 260/152, 156, 157, 160, 260/165; 8/41 B

[56] References Cited

U.S. PATENT DOCUMENTS

| | | | |
|---|---|---|---|
| 2,805,218 | 9/1957 | Towne et al. | 260/152 |
| 3,485,814 | 12/1969 | Speck | 260/184 X |
| 3,544,550 | 12/1970 | Anderton et al. | 260/152 X |
| 3,553,190 | 1/1971 | Anderton et al. | 260/152 X |
| 3,657,220 | 4/1972 | Kilmurry | 260/207 |
| 3,676,050 | 7/1972 | James | 260/184 X |

FOREIGN PATENT DOCUMENTS

| | | | |
|---|---|---|---|
| 2324512 | 11/1973 | Fed. Rep. of Germany | 260/152 |

OTHER PUBLICATIONS

Sorokin, Chemical Abstracts, vol. 61, 1964, 8444c.

Venkataraman, The Chemistry of Synthetic Dyes, vol. 1, Academic Press, Inc.: New York, 1952, p. 270.

*Primary Examiner*—Charles F. Warren
*Attorney, Agent, or Firm*—Sprung, Felfe, Horn, Lynch & Kramer

[57] ABSTRACT

Dyestuffs which in the free acid form correspond to the formula

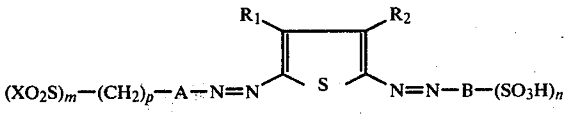

wherein

A represents the radical of an aromatic carbocyclic or aromatic heterocyclic diazo component, B represents the radical of a carbocyclic or heterocyclic coupling component, X represents OH, $—NHSO_2—R_3$, $—N(R_4)—alkylene-SO_3H$, $—N(R_4)-arylene-SO_3H$, $—N(R_4)-arylene—CH_2—SO_3H$ or $—N(R_4)-arylene-SO_2—NH-SO_2-R_3$ and $N(R_4)-alkylene-O-SO_3H$, $R_1$ represents alkyl, aryl, carbalkoxy or hydrogen, $R_2$ represents carbalkoxy, carboxylic acid amide or cyano, $R_3$ represents alkyl or aryl, $R_4$ represents hydrogen or alkyl, m and n represent 0, 1 or 2, p represents 0 or 1 and m+n represent 1 or 2 are suitable for the dyeing of natural and synthetic fibre materials, particularly for the dyeing of polyamide fibre materials.

5 Claims, No Drawings

ACID DISAZO DYESTUFFS CONTAINING A SUBSTITUTED THIOPHENE MIDDLE COMPONENT

The invention relates to disazo dyestuffs which in the form of the free acid correspond to the formula

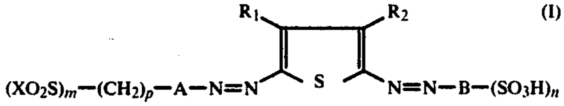
(1)

wherein

A represents the radical of an aromatic carbocyclic or aromatic heterocyclic diazo component, B represents the radical of a carbocyclic or heterocyclic coupling component, X represents OH, $-NHSO_2-R_3$, $-N(R_4)$—alkylene—$SO_3H$, $-N(R_4)$—arlyene—$SO_3H$, $-N(R_4)$—arylene—$CH_2-SO_3H$ or $-N(R_4)$—arylene—$SO_2-NH-SO_2-R_3$ and $N(R_4)$—alkylene—$O-SO_3H$, $R_1$ represents alkyl, aryl, carbalkoxy or hydrogen, $R_2$ represents carbalkoxy, carboxylic acid amide or cyano, $R_3$ represents alkyl or aryl, $R_4$ represents hydrogen or alkyl, m and n represent 0, 1 or 2, p represents 0 or 1 and m+n represent 1 or 2.

Suitable radicals A of a heterocyclic diazo component are those of the thiazole, benzthiazole, thiadiazole, triazole, pyrazole or thiophene series, which can optionally be substituted by $C_1$-$C_4$-alkyl, aryl, halogen, cyano, optionally substituted carbamoyl, carbalkoxy or nitro.

Suitable radicals A of aromatic-carbocyclic diazo components are those of the benzene or naphthalene series which can be substituted by halogen, cyano, carbalkoxy, trifluoromethyl, alkyl, alkoxy, hydroxyl, thiocyanato, alkylsulphonyl, arylsulphonyl or aralkylsulphonyl, carbamoyl or sulphamoyl radicals.

Suitable radicals B of a carbocyclic or heterocyclic coupling component are

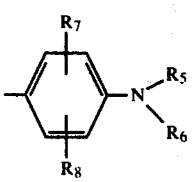
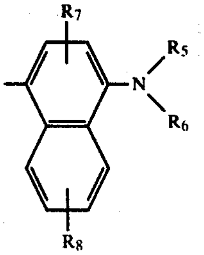
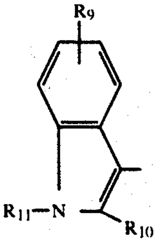
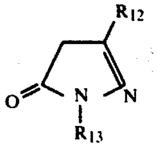

-continued

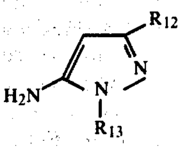
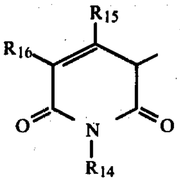
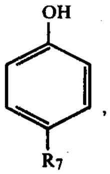
,
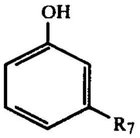

wherein $R_5$ represents alkyl, aralkyl or hydrogen, $R_6$ represents alkyl, aralkyl or hydrogen, $R_7$ represents hydrogen, alkyl, alkoxy, halogen, alkylsulphonyl, aralkylsulphonyl, arylsulphonyl, sulphamoyl, a sulphonic acid radical, carbamoyl, carbalkoxy or acylamino, $R_8$ represents hydrogen, alkyl, halogen, alkoxy or acylamino, $R_9$ represents hydrogen, alkyl, alkoxy, halogen, cyano or the sulphonic acid radical, $R_{10}$ represents alkyl, phenyl or hydrogen, $R_{11}$ represents hydrogen or alkyl, $R_{12}$ represents cyano, hydrogen, alkyl, phenyl, carbalkoxy or carboxylic acid amide, $R_{13}$ represents hydrogen, alkyl or aryl, $R_{14}$ represents hydrogen or alkyl, $R_{15}$ represents hydrogen, alkyl, hydroxyl, phenyl or carbalkoxy and $R_{16}$ represents cyano, carboxylic acid amide or carbonalkoxy.

The carbamoyl radicals $R_2$, $R_7$, $R_{12}$ and $R_{16}$ or the sulphamoyl radicals $R_7$, as well as the carbamoyl radicals and sulphamoyl radicals which may represent substituents of A, are optionally monosubstituted or disubstituted by alkyl, aralkyl, aryl or cycloalkyl or the radical of a heterocyclic ring, and the substituents, together with the nitrogen of the carbamoyl or sulphamoyl radical and optionally a further hetero-atom can be cyclised to form a five-membered or six-membered heterocyclic ring. Radicals of such heterocyclic rings are, for example

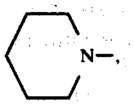
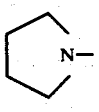
or
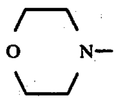

Suitable alkyl groups $R_1$, $R_3$, $R_9$, $R_{10}$, $R_{12}$ and $R_{15}$ are, for example, unsubstituted $C_1$-$C_4$-alkyl radicals, for example methyl, ethyl, propyl and iso-butyl.

Suitable alkyl radicals as substituents of A, $R_4$, $R_7$, $R_8$, $R_{11}$, $R_{13}$ and $R_{14}$, or of the alkylsulphonyl groups, the alkylsulphonylamino groups, the carbamoyl radicals, the sulphamoyl radicals or the carboxylic acid esters are, for example, those with 1-4 C atoms, which can optionally be substituted by halogen, cyano, hydroxyl or $C_1$-$C_4$-alkoxy, for example methyl, ethyl, propyl, isobutyl, hydroxyethyl, cyanoethyl, chloroethyl, 2-hydroxylbutyl, methoxyethyl, propoxymethyl or butoxymethyl.

Suitable alkyl groups $R_5$ and $R_6$ are, for example, those with 1–4 carbon atoms, which can optionally be substituted by halogen, cyano, hydroxyl, $C_1$–$C_4$-alkoxy, benzyloxy, phenoxy, $C_1$–$C_4$-alkylcarbonyloxy, $C_1$–$C_4$-alkoxycarbonyloxy, phenoxycarbonyloxy or arylcarbonyloxy, such as, for example, benzoyloxy, or by the sulphonic acid radical, for example methyl, ethyl, propyl, methoxymethyl, ethoxyethyl, hydroxyethyl, cyanoethyl, chloroethyl, phenoxyethyl, benzyloxyethyl, acetoxyethyl, propionyloxyethyl, ethoxycarbonyloxyethyl, butoxycarbonyloxyethyl, benzoyloxyethyl, phenoxycarbonyloxy ethyl or the $—CH_2—CH_2—SO_3H$ radical.

Suitable aryl radicals $R_1$, $R_3$, $R_6$, $R_{10}$, $R_{12}$ and $R_{15}$ of the carbamoyl groups and sulphamoyl groups and of the arylsulphonyl groups are, in particular, phenyl or naphthyl radicals which are optionally substituted further by phenyl, $C_1$–$C_4$-alkyl, nitro, halogen or $C_1$–$C_4$-alkoxy, for example phenyl, 1-naphthyl, 2-naphthyl, p-biphenyl, 4-chlorophenyl, 2,4-dichlorophenyl, 4-ethoxyphenyl, o-, m- and p-tolyl, 4-nitrophenyl or 4-ethylphenyl.

Suitable aryl groups $R_{13}$ are in particular phenyl or naphthyl radicals which are optionally substituted further by phenyl, $C_1$–$C_4$-alkyl, nitro, halogen, $C_1$–$C_4$-alkoxy or the sulphonic acid radical, for example phenyl, 1-naphthyl, 2-naphthyl, p-biphenyl, 2-chlorophenyl, 4-chlorophenyl, 2,5-dichlorophenyl, 2-nitrophenyl, 3-nitrophenyl, o-, m- and p-tolyl, 4-ethoxyphenyl, 3-phenylsulphonic acid, 3-phenyl-4-chlorosulphonic acid and 4-phenyl-3,4-dichlorosulphonic acid.

Suitable aralkyl groups as substituents of the sulphamoyl, carbamyl or aralkylsulphonyl groups are, in particular, benzyl or 2-phenylethyl groups. The phenyl radical of these groups can optionally be substituted further by $C_1$–$C_4$-alkyl, $C_1$–$C_4$-alkoxy, halogen or cyano, such as, for example, benzyl, 2-phenylethyl, p-ethylbenzyl, p-methoxybenzyl, 2,4-dichlorobenzyl, 4-cyanobenzyl and p-bromophenylethyl.

Suitable aralkyl groups $R_6$ are, in particular, benzyl or 2-phenylethyl groups. The phenyl radical of these groups can optionally be substituted by $C_1$–$C_4$-alkoxy, halogen, cyano or the sulphonic acid radical, such as, for example, benzyl, 2-phenylethyl, p-methylbenzyl, p-methoxybenzyl, 2,4-dichlorobenzyl, 4-cyanobenzyl or 3-sulphobenzyl.

Suitable carbalkoxy groups $R_1$, $R_2$, $R_7$, $R_{12}$ and $R_{16}$ and carbalkoxy groups as substituents of A are, in particular, carbo-$C_1$–$C_4$-alkoxy, such as carbethoxy, carbo-iso-propoxy and carbomethoxy.

Suitable halogen atoms are fluorine, chlorine and bromine, especially chlorine and bromine.

Suitable alkoxy radicals $R_7$, $R_8$ and $R_9$ or alkoxy radicals as substituents A are, in particular, $C_1$–$C_4$-alkoxy, which can optionally be substituted by OH, halogen or cyano, such as, for example, methoxy, ethoxy, butoxy, 2-hydroxyethoxy, 2-cyanoethoxy or 2-chloroethoxy.

Suitable alkylene radicals in

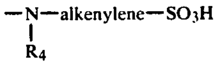

and

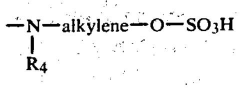

are, in particular, $C_2$–$C_4$-alkylene radicals, for example $—CH_2—CH_2—$,

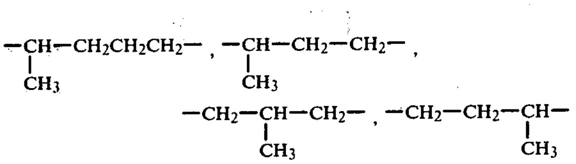

or $—CH_2—CH_2—CH_2—CH_2$.

Suitable arylene radicals in

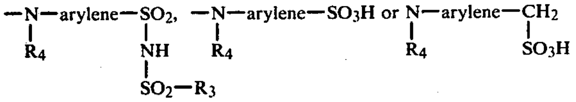

are, in particular, 1,2-, 1,3- or 1,4-phenylene radicals. The phenylene radicals can be substituted further, for example by alkyl, especially $C_1$–$C_4$-alkyl, by alkoxy, especially $C_1$–$C_4$-alkoxy, such as $CH_3$-O- or $C_2H_5$-O-, or aralkoxy such as $C_6H_5$-$CH_2$-O-, or by chlorine, bromine, cyano or nitro.

A suitable heterocyclic ring as substituent of a sulphamoyl or carbamoyl radical is, for example, the 2-sulpholane radical.

Suitable acyl radicals of the acylamino group $R_7$ and $R_8$ are, in particular, $C_1$–$C_4$-alkylcarbonyl, arylcarbonyl, $C_1$–$C_4$-alkylsulphonyl and arylsulphonyl. A suitable aryl radical is, in particular, the phenyl radical, which can optionally be substituted by $C_1$–$C_4$-alkyl, $C_1$–$C_4$-alkoxy, chlorine or cyano.

The following may be mentioned as examples of acyl radicals: acetyl, propionyl, methylsulphonyl, ethylsulphonyl, p-methylphenylsulphonyl, phenylsulphonyl, 2,5-dimethylphenylsulphonyl, 2-methyl-5-chlorophenylsulphonyl, p-ethoxybenzoyl, p-chlorobenzyl, o-chlorobenzyl or p-cyanobenzoyl.

A preferred group of these dyestuffs are those which in the form of the free acid correspond to the formula

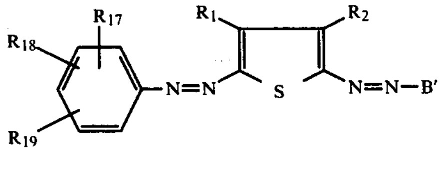

(II)

wherein

B' represents the radicals

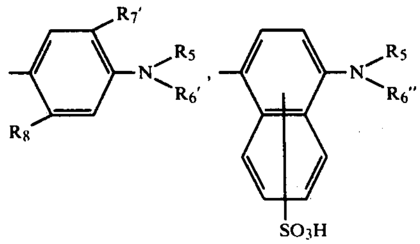

-continued

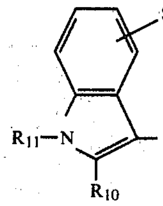

,

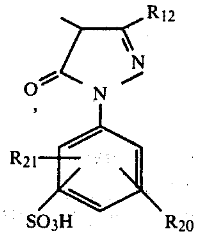

,

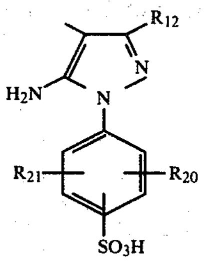

$R_1$, $R_2$, $R_5$, $R_{10}$, $R_{11}$ and $R_{12}$ have the abovementioned meaning and $R_6'$ represents $C_1$-$C_4$-alkyl, $CH_2$-$CH_2$-$SO_3$-H or 3-sulphobenzyl, $R_6''$ represents hydrogen, $C_1$-$C_4$-alkyl, benzyl or 2-phenylethyl, $R_7'$ represents hydrogen, $C_1$-$C_4$-alkyl, $C_1$-$C_4$-alkoxy, halogen or $C_1$-$C_4$-alkylsulphonyl, $R_{17}$ and $R_{18}$ represent hydrogen, chlorine, bromine, cyano. $C_1$-$C_4$-alkyl, $C_1$-$C_4$-alkoxy, a carbamoyl or sulphamoyl radical, hydroxyl, trifluoromethyl or a $C_1$-$C_4$-alkyl-, a phenyl- or a benzylsulphonyl radical, $R_{19}$ represents hydrogen, $C_1$-$C_4$-alkyl, $CF_3$, Cl or Br and $R_{20}$ and $R_{21}$ represent hydrogen, $C_1$-$C_4$-alkyl, Cl or Br.

A particularly preferred group of the dyestuffs of the formula (II) are those which in the form of the free acid correspond to the formula

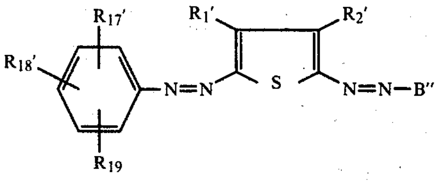

wherein

B'' represents the radicals

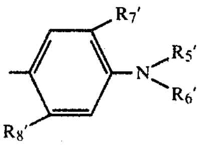

,

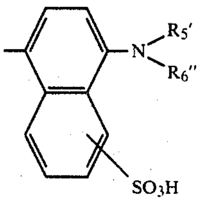

,

-continued

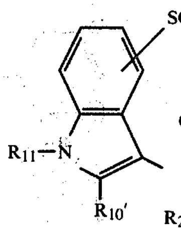

,

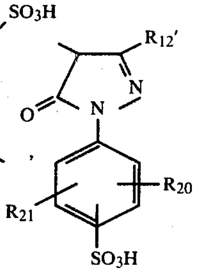

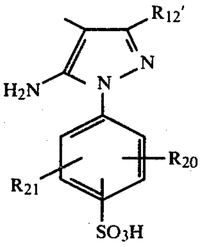

and $R_6'$, $R_6''$, $R_7'$, $R_{11}$, $R_{19}$, $R_{20}$ and $R_{21}$ have the abovementioned meaning, $R_1'$ represents methyl, ethyl, phenyl which is optionally substituted by Cl or $NO_2$, carbo-$C_1$-$C_4$-alkoxy or hydrogen, $R_2'$ represents carbon-$C_1$-$C_4$-alkoxy, cyano, $CONH_2$, $CON(CH_3)_2$ or $CON(C_2H_5)_2$, $R_5'$ represents $C_1$-$C_4$-alkyl which is not substituted further, benzyl or hydrogen, $R_8'$ represents hydrogen, $CH_3$—, $C_2H_5$—, —$OCH_3$, —$OC_2H_5$, Cl or

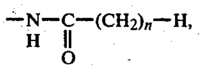

n=1, 2 or 3, $R_{10}'$ represents methyl, ethyl or phenyl, $R_{12}'$ represents hydrogen, methyl, phenyl or carbomethoxy or carboethoxy and $R_{17}'$ and $R_{18}'$ represent hydrogen, chlorine, bromine, cyano, $C_1$-$C_2$-alkyl, $C_1$-$C_2$-alkoxy, $C_2$-$C_4$-carboalkoxy, a carbamoyl or sulphamoyl radical which can be monosubstituted or disubstituted by $C_1$-$C_3$-alkyl, or a $C_1$-$C_4$-alkylsulphonyl, phenylsulphonyl or benzylsulphonyl radical.

Particularly preferred dyestuffs are, in particular, those of the formula

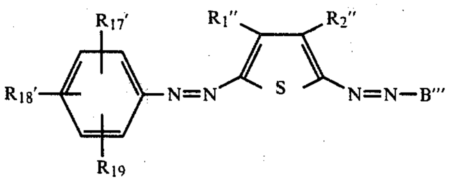

wherein

B''' represents the radicals

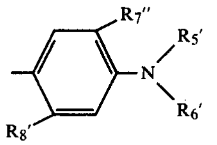

,

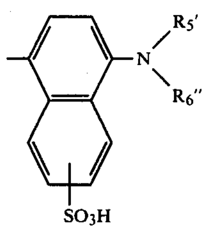

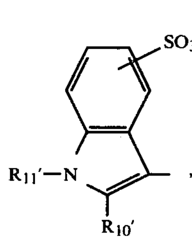

,

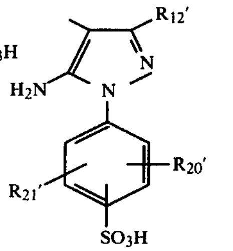

,

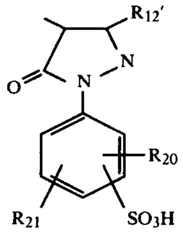

$R_5'$, $R_6'$, $R_6''$, $R_8'$, $R_{10}'$, $R_{12}'$, $R_{17}'$, $R_{18}'$ and $R_{19}$ have the meaning mentioned and $R_1''$ represents hydrogen, methyl of phenyl, $R_2''$ represents carbomethoxy, carboethoxy, cyano or unsubstituted carbamoyl, $R_7''$ represents methoxy, ethoxy, methylsulphonyl or hydrogen, $R_{11}'$ represents hydrogen or methyl and $R_{20}'$ and $R_{21}''$ represent hydrogen, methyl or chlorine.

Very particularly preferred dyestuffs are those which in the form of the free acid correspond to the formula

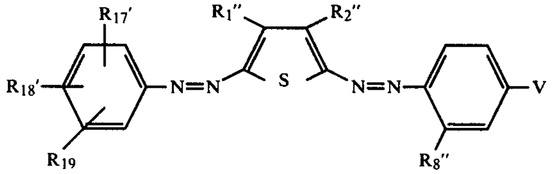

wherein $R_1''$, $R_2''$, $R_{17}'$, $R_{18}'$ and $R_{19}$ have the abovementioned meaning, V represents the groups

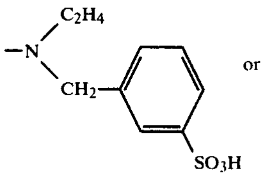

or

-continued

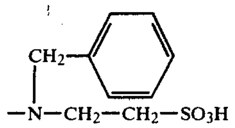

and $R_8''$ denotes hydrogen, methyl, methoxy or acetylamino.

Further preferred dyestuffs are those which in the form of the free acid correspond to the formula p = 0 or 1

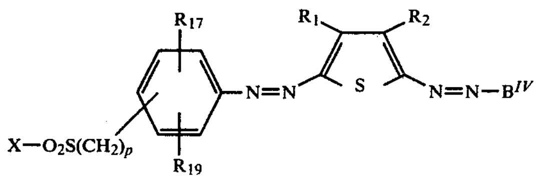

or to the formula

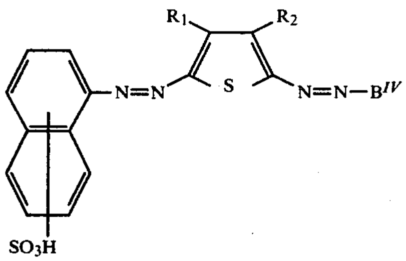

wherein $B^{IV}$ represents

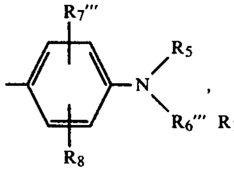

,

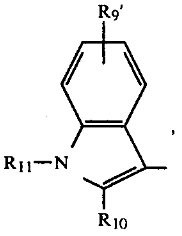

,

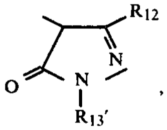

,

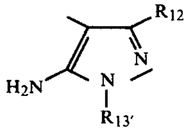

or

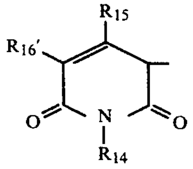

X, $R_1$, $R_2$, $R_5$, $R_8$, $R_{10}$, $R_{11}$, $R_{12}$, $R_{14}$, $R_{15}$, $R_{16}$, $R_{17}$ and $R_{19}$ have the abovementioned meaning and $R_6'''$ represents hydrogen, $C_1$–$C_4$-alkyl, which may be substituted by Cl, CN,

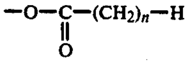 or 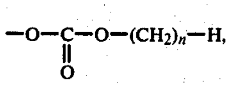

with n=1, 2 or 3, benzyl, or 2-phenethyl, $R_7'''$ represents hydrogen $C_1$–$C_4$-alkyl, $C_1$–$C_4$-alkoxy or halogen, $R_9'$ represents hydrogen, chlorine, methyl, ethyl, methoxy or ethoxy and $R_{13}'$ represents hydrogen, $C_1$–$C_4$-alkyl or phenyl which is optionally substituted by nitro, halogen, $C_1$–$C_4$-alkyl or $C_1$–$C_4$-alkoxy.

Particularly preferred dyestuffs are those which in the form of the free acid correspond to the formula

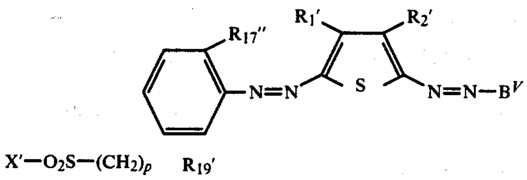

and to the formula

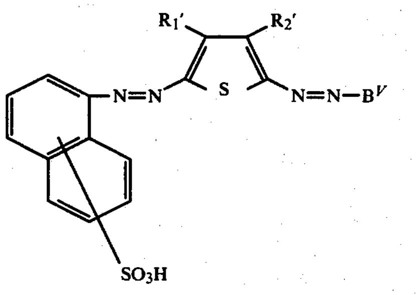

wherein p represents 0 or 1 and $B^V$ represents

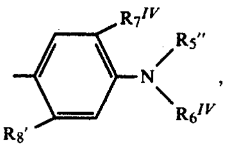, 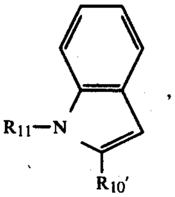,

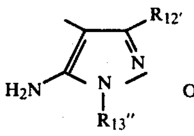 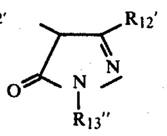 or

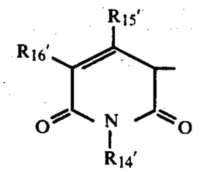 and $R_1'$, $R_2'$, $R_8'$, $R_{10}'$, $R_{11}$ and $R_{12}'$ have the abovementioned meaning.

Furthermore,

X' represents OH, $-NH-SO_2-R_3'$,

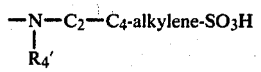

or

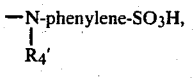

$R_3'$ represents unsubstituted $C_1$–$C_4$-alkyl, o-, m- or p-toloyl or o-, m- or p-chlorophenyl, $R_4'$ represents hydrogen, methyl, or ethyl, $R_5''$ and $R_6^{IV}$ represent hydrogen, $C_1$–$C_4$-alkyl, which can be substituted by Cl, CN,

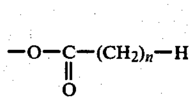

or

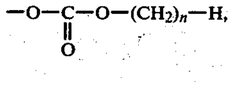

with n=1, 2 or 3, benzyl or 2-phenylethyl, $R_7^{IV}$ presents hydrogen, methyl, ethyl, methoxy or ethoxy, $R_{13}''$ represents hydrogen, $C_1$–$C_4$-alkyl which is not substituted further, or phenyl which can be monosubstituted or disubstituted by $CH_3$ or chlorine, $R_{14}'$ and $R_{15}'$ represent $C_1$–$C_4$-alkyl which is not substituted further, $R_{16}'$ represents CN,

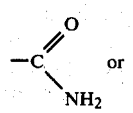 or 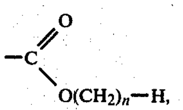

with n=1, 2, 3 or 4 and $R_{17}''$ and $R_{19}'$ represent hydrogen, methyl, ethyl, chlorine , bromine or trifluoromethyl.

Very particularly preferred dyestuffs are those which in the form of the free acid correspond to the formula

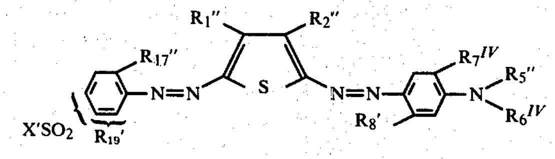

and $R_1''$, $R_2''$, $R_5''$, $R_6^{IV}$, $R_7^{IV}$, $R_8'$, $R_{17}''$, $R_{19}'$ and X' have the abovementioned meaning.

Dyestuffs of the formula (I) are obtained by coupling a diazotised amine of the formula $$(X\text{-}SO_2)_m\text{-}(CH_2)_p\text{-}A\text{-}NH_2$$

wherein

X, m, p and A have the abovementioned meaning, to a thiophene of the formula

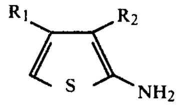

wherein $R_1$ and $R_2$ have the abovementioned meaning, and renewed diazotisation of the resulting dyestuff of the formula

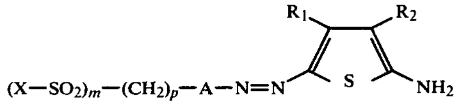

wherein

X, m, p, A, $R_1$ and $R_2$ have the abovementioned meaning, following by coupling with a coupling component of the formula $B\text{-}(SO_3H)_n$ wherein B and n have the abovementioned meaning.

Examples of amines suitable for use as diazo components are: 2-aminonaphthalene-1-sulphonic acid, 4-aminonaphthalene-1-sulphonic acid, 5-aminonaphthalene-1-sulphonic acid, 6-aminonaphthalene-1-sulphonic acid, 7-aminonaphthalene-1-sulphonic acid, 8-aminonaphthalene-1-sulphonic acid, 1-aminonaphthalene-2-sulphonic acid, 4-aminonaphthalene-2-sulphonic acid, 5-aminonaphthalene-2-sulphonic acid, 6-aminonaphthalene-2-sulphonic acid, 7-aminonaphthalene-2-sulphonic acid, 8-aminonaphthalene-2-sulphonic acid, 2-aminobenzenesulphonic acid, 4-chloro-2-aminobenzenesulphonic acid, aniline, 2-, 3- or 4-chloroaniline, 2,5-dichloroaniline, 2,4-dichloroaniline, 3-bromoaniline, 2-bromoaniline, 2-trifluoromethylaniline, 2-, 3- or 4-toluidine, 2-, 3- or 4-anisidine, 2-ethylaniline, 4-propoxyaniline, 4-benzylsulphonylaniline, 2-chloro-4-ethylsulphonylaniline, 2,5-dichloro-4-propylsulphonylaniline, aniline-4-N,N-dimethylsulphonamide, 2-chloroaniline-4-sulphonamide, 2-trifluoromethylaniline-4-N-benzylsulphonamide, 2,5-dichloroaniline-4-sulphonanilide, 2-chloroaniline-4-(2-methyl)-sulphonanilide, 2,5-dichloroaniline-4-N-hydroxypropylsulphonamide, 2-chloroaniline-4-N-cyclohexylsulphonamide-2-trifluoromethylaniline-4-N-methyl-N-phenylsulphonamide, 2-chloro-5-bromoaniline-4-N,N-dimethylsulphonamide, 2-chloro-6-methylaniline-4-N-methylsulphonamide, 2,5-dibromoaniline-4-N-benzylsulphonamide, aniline-4-sulphonic acid, 2-chloroaniline-4-sulphonic acid, 2,5-dichloroaniline-4-sulphonic acid, 2,5-dibromoaniline-4-sulphonic acid, 2-trifluoromethylaniline-5-sulphonic acid, 2-bromoaniline-4-sulphonic acid, 2,6-dibromoaniline-4-sulphonic acid, 2,6-dicyanoaniline-4-sulphonic acid, 2-trifluoromethyl-5-chloroaniline-4-sulphonic acid, 2-methylaniline-4-sulphonic acid, 3-methylaniline-4-sulphonic acid, 3-chloroaniline-5-sulphonic acid, 2,5-dimethoxyaniline-4-sulphonic acid, 1-aminonaphthalene-4-sulphonic acid, (3-amino-4-chlorobenzenesulphonyl)-methanesulphonamide, (3-amino-4-chlorobenzenesulphonyl)-butanesulphonamide, (3-amino-4-chlorobenzenesulphonyl)-o-toluenesulphonamide, (3-amino-4-chlorobenzenesulphonyl)-benzenesulphonamide, (3-amino-6-methylbenzenesulphonyl)-benzenesulphonamide, (3-amino-6-methoxybenzenesulphonyl)-butanesulphonamide, (4-aminobenzenesulphonyl)-p-toluenesulphonamide, (4-aminobenzenesulphonyl)-o-toluenesulphonamide, (4-aminobenzenesulphonyl)-methylsulphonamide, (4-aminobenzenesulphonyl)-butanesulphonamide, (4-amino-3-trifluoromethylbenzenesulphonyl)-benzenesulphonamide, (4-amino-3-trifluoromethylbenzenesulphonyl)-methanesulphonamide, (4-amino-3-trifluoromethylbenzenesulphonyl)-butanesulphonamide, (4-amino-3-trifluoromethylbenzenesulphonyl)-p-toluenesulphonamide, (4-amino-3-trifluoromethylbenzenesulphonyl)-o-toluenesulphonamide, (4-amino-3-trifluoromethylbenzenesulphonyl)-2-naphthylsulphonamide, (4-amino-3-chlorobenzenesulphonyl)-benzenesulphonamide, (4-amino-3-chlorobenzenesulphonyl)-p-toluenesulphonamide, (4-amino-3-chlorobenzenesulphonyl)-methanesulphonamide, (4-amino-3-chlorobenzenesulphonyl)-dimethylaminosulphonamide, (4-amino-3-bromobenzenesulphonyl)-benzenesulphonamide, (4-amino-3-methylbenzenesulphonyl)-benzenesulphonamide, (4-amino-3-methylbenzenesulphonyl)-p-toluenesulphonamide, (4-amino-2,5-dichlorobenzenesulphonyl)-benzenesulphonamide, (4-amino-2,5-dichlorobenzenesulphonyl)-propanesulphonamide, (4-amino-2,5-dichlorobenzenesulphonyl)-p-toluenesulphonamide, (4-amino-2,5-dichlorobenzenesulphonyl)-dimethylaminosulphonamide, (4-amino-3,5-dichlorobenzenesulphonyl)-benzenesulphonamide, (4-amino-2-chloro-5-trifluoromethylbenzenesulphonyl)-benzenesulphonamide, (4-amino-2-chloro-5-trifluoromethylbenzenesulphonyl)-methanesulphonamide, (4-amino-2-chloro-5-trifluoromethylbenzenesulphonyl)-2-naphthylsulphonamide, (4-amino-2-trifluoromethyl-5-chlorobenzenesulphonyl)-benzenesulphonamide, (4-amino-2-trifluoromethyl-5-chlorobenzenesulphonyl)-2-naphthylsulphonamide, (4-amino-2-trifluoromethyl-5-bromobenzenesulphonyl)-butanesulphonamide, (4-amino-2-trifluoromethylbenzenesulphonyl)-methanesulphonamide, (4-amino-2-trifluoromethylbenzenesulphonyl)-butanesulphonamide, (4-amino-2-methyl-5-chlorobenzenesulphonyl)-p-toluenesulphonamide, (4-amino-2-methyl-5-chlorobenzenesulphonyl)-o-toluenesulphonamide, (4-amino-2,5-dibromobenzenesulphonyl)-benzenesulphonamide, (4-amino-2,5-dimethylbenzenesulphonyl)-butanesulphonamide, N-(4-aminophenylsulphonyl)-2-aminoethanesulphonic acid, N-methyl-N-(4-aminophenylsulphonyl)-2-aminoethanesulphonic acid, N-propyl-N-(4-aminophenylsulphonyl)-2-aminoethanesulphonic acid, N-(4-amino-2-chlorophenylsulphonyl)-2-aminoethanesulphonic acid, N-ethyl-N-(4-amino-2-chlorophenylsulphonyl)-2-aminoethanesulphonic acid, N-(4-amino-3-chlorophenylsulphonyl)-2-aminoethanesulphonic acid, N-methyl-N-(4-amino-3-chlorophenylsulphonyl)-2-aminoethanesulphonic acid, N-ethyl-N-(4-amino-3-chlorophenylsulphonyl)-2-aminoethanesulphonic acid, N-(4-amino-2,5-dichlorophenylsulphonyl)-2-aminoethanesulphonic acid, N-methyl-N-(4-amino-2,5-dichlorophenylsulphonyl)-2-aminoethanesulphonic acid, N-ethyl-N-(4-amino-2,5-dichlorophenylsulphonyl)-2-aminoethanesulphonic acid, N-(4-amino-3,5-dichlorophenylsulphonyl)-2-aminoethanesulphonic acid, N-methyl-N-(4-amino-3,5-dichlorophenylsulphonyl)-2-aminoethanesulphonic acid, N-(4-aminophenylsulphonyl)-2-aminoethanesulphonic acid, N-methyl-N-(4-aminophenylsulphonyl)-2-aminoethanesulphonic acid, N-(4-amino-2-chlorophenylsulphonyl)-

2-aminoethanesulphonic acid, N-ethyl-N-(4-amino-2-chlorophenylsulphonyl)-2-aminoethanesulphonic acid, N-(4-amino-3-chlorophenylsulphonyl)-2-aminoethanesulphonic acid, N-methyl-N-(4-amino-3-chlorophenylsulphonyl)-2-aminoethanesulphonic acid, N-ethyl-N-(4-amino-3-chlorophenylsulphonyl)-2-aminoethanesulphonic acid, N-(4-amino-2,5-dichlorophenylsulphonyl)-2-aminoethanesulphonic acid, N-methyl-N-(4-amino-2,5-dichlorophenylsulphonyl)-2-aminoethanesulphonic acid, N-ethyl-N-(4-amino-2,5-dichlorophenylsulphonyl)-2-aminoethanesulphonic acid, N-(4-amino-3,5-dichlorophenylsulphonyl)-2-aminoethanesulphonic acid, N-methyl-N-(4-amino-3,5-dichlorophenylsulphonyl)-2-aminoethanesulphonic acid, N-(4-amino-3-methylphenylsulphonyl)-2-aminoethanesulphonic acid, N-(4-amino-3-methoxyphenylsulphonyl)-2-aminoethanesulphonic acid, N-methyl-N-(4-amino-3-methoxyphenylsulphonyl)-2-aminoethanesulphonic acid, N-(4-amino-3-trifluoromethylphenylsulphonyl)-2-aminoethanesulphonic acid, N-methyl-N-(4-amino-3-trifluoromethylphenylsulphonyl)-2-aminoethanesulphonic acid, N-propyl-N-(4-amino-3-trifluoromethylphenylsulphonyl)-2-aminoethanesulphonic acid, N-(4-aminophenylsulphonyl)-3-aminopropylsulphonic acid, N-methyl-N-(4-aminophenylsulphonyl)-3-aminopropylsulphonic acid, N-(4-amino-2-chlorophenylsulphonyl)-3-aminopropylsulphonic acid, N-(4-amino-2,5-dichlorophenylsulphonyl)-3-aminopropylsulphonic acid, N-(4-amino-3,5-dichlorophenylsulphonyl)-3-aminopropylsulphonic acid, N-propyl-N-(4-amino-3,5-dichlorophenylsulphonyl)-3-aminopropylsulphonic acid, N-(4-amino-3-trifluoromethylphenylsulphonyl)-3-aminopropylsulphonic acid, N-methyl-N-(4-amino-2,5-dichlorophenylsulphonyl)-3-aminobutylsulphonic acid, N-(4-amino-2,5-dichlorophenylsulphonyl)-3-aminophenylsulphonic acid, N-(4-amino-3-trifluoromethylphenylsulphonyl)-3-amino-phenylsulphonic acid, N-(4-amino-2,5-dichlorophenylsulphonyl)-4-aminophenylsulphonic acid, N-methyl-N-(4-amino-2,5-dichlorophenyl)-sulphonyl)-4-aminophenylsulphonic acid, N-(4-amino-2,5-dichlorophenyl)-sulphonyl-2-aminoethyl-sulphonate, N-methyl-N-(4-amino-2,5-dichlorophenylsulphonyl)-2-aminoethyl-sulphate, N-ethyl-N-(4-amino-2-dichlorophenylsulphonyl)-2-aminoethylsulphate, N-(4-aminophenylsulphonyl)-2-aminoethyl-sulphate and N-methyl-N-(4-aminophenylsulphonyl)-2-amino-1-methylethyl-sulphate.

Examples of suitable aminothiophenes are: 2-amino-3-carbethoxythiophene, 2-amino-3-carbomethoxy-4-methylthiophene, 2-amino-3-cyanothiophene, 2-amino-3-cyano-4-ethylthiophene, 2-amino-3-cyano-4-methylthiophene, 2-amino-3-carbethoxy-4-carbethoxythiophene, 2-amino-3-carbethoxy-4-phenylthiophene, 2-amino-3-carbethoxy-4-(4-nitrophenyl)-thiophene, 2-amino-3-carbamoylthiophene, 2-amino-3-carbamoyl-4-methylthiophene and 2-amino-3-carbamoyl-4-phenylthiophene.

Examples of suitable coupling components for the diazotised monoazo dyestuffs are: N,N-diethylaniline, N,N-dipropylaniline, N,N-dibutylaniline, 3-methyl-N,N-diethylaniline, 3-methyl-N-ethyl-N-(2-cyanoethyl)-aniline, 3-methyl-N-ethyl-N-(2-methylcarbonyloxyethyl)-aniline, 3-methyl-N-(2-methyloxycarbonyloxyethyl)-N-ethylaniline, 3-ethyl-N,N-diethylaniline, 3-methyl-N,N-di-(2-ethoxycarbonyloxyethyl)-aniline, 3-methyl-N,N-di-(2-butoxycarbonyloxyethyl)-aniline, 3-acetylamino-N,N-diethylaniline, 3-acetylamino-N-ethyl-N-(2-ethoxycarbonyloxyethyl)-aniline, 3-acetylamino-N-ethyl-N-(2-cyanoethyl)-aniline, 3-acetylamino-N-(2-cyanoethyl)-N-(2-carbethoxycarbonyloxyethyl)-aniline, 3-(propylcarbonylamino)-N,N-diethylaniline, 3-(methylsulphonylamino)-N,N-diethylaniline, 3-(butylsulphonylamino)-N,N-diethylaniline, 3-(phenylsulphonylamino-N,N-diethylaniline, 3-acetylamino-6-ethoxy-N,N-diethylaniline, 3-acetylamino-6-methoxy-N,N-diethylaniline, 3-acetylamino-6-methoxy-N-ethyl-N-(2-cyanoethyl)-aniline, 3-acetylamino-6-methoxy-N,N-di-(2-ethoxycarbonyloxyethyl)-aniline, 3-chloro-N,N-diethylaniline, 3-chloro-N,N-dimethylaniline, 3-chloro-N-ethyl-N-(2-cyanoethyl)-aniline, 2-carbamoyl-N,N-diethylaniline, 2-carbethoxy-N,N-diethylaniline, N-ethyl-N-(2-sulphoethyl)-aniline, 3-methyl-N-ethyl-N-(2-sulphoethyl)-aniline, 3-methyl-N-benzyl-N-(2-sulphoethyl)-aniline, 3-methyl-N-ethyl-N-(3-sulphobenzyl)-aniline, N-ethyl-N-(3-sulphoebenzyl)-aniline, 3-methyl-N-methyl-N-(3-sulphobenzyl)-aniline, 3-methoxy-N-ethyl-N-(3-sulphobenzyl)-aniline, 3-acetamino-N-butyl-N-(3-sulphobenzyl)-aniline, 8-anilinonaphthalene-1-sulphonic acid, 8-p-toluidinonaphthalene-1-sulphonic acid, N,N-diethyl-8-aminonaphthalene-1-sulphonic acid, N,N-diethyl-5-aminonaphthalene-2-sulphonic acid, N-ethyl-N-(2-cyanoethyl)-5-aminonaphthalene-2-sulphonic acid, indole, 1-methylindole, 3-methylindole, 2-phenylindole, 2-ethylindole, 1-methyl-2-phenylindole, 2-phenylindolesulphonic acid, 1-methylindolesulphonic acid, 1-(2-hydroxypropyl)-2-methylindole, 1-(2-hydroxybutyl)-2-methylindole, 1-(2-hydroxy-2-phenylethyl)-2-methylindole, 1-(2-hydroxy-2-methylpropyl)-2-methylindole, 1-(2-hydroxy-3-phenoxypropyl)-2-methylindole, 1-(1-hydroxypropyl-2)-2-methylindole, 1-(2-hydroxypropyl)-2-phenylindole, 1-(2-hydroxybutyl)-2-phenylindole, 1-(2-hydroxy-2-phenylethyl)-2-phenylindole, 1-(2-hydroxy-2-methylpropyl)-phenylindole, 1-(2-hydroxy-3-phenoxypropyl)-2-phenylindole, 1-(1-hydroxypropyl-2)-2-phenylindole, 1-(2-hydroxypropyl)-2-methylindolesulphonic acid, 1-(2-hydroxybutyl-2-methylindolesulphonic acid, 1-(2-hydroxy-2-phenylethyl)-2-methylindolesulphonic acid, 1-(2-hydroxy-2-methylpropyl)-2-methylindolesulphonic acid, 1-(2-hydroxy-3-phenoxypropyl)-2-methylindolesulphonic acid, 1-(1-hydroxypropyl-2)-2-methylindolesulphonic acid, 1-(2-hydroxypropyl)-2-phenylindolesulphonic acid, 1-(2-hydroxybutyl)-2-phenylindolesulphonic acid, 1-(2-hydroxy-2-phenylethyl)-2-phenylindolesulphonic acid, 1-(2-hydroxy-2-methylpropyl)-2-phenylindolesulphonic acid, 1-(2-hydroxy-3-phenoxypropyl)-2-phenylindolesulphonic acid, 1-(1-hydroxypropyl-2)-2-phenyl-indolesulphonic acid, 3-methyl-5-pyrazolone, 1-phenyl-3-methyl-5-pyrazolone, 1-(2-chlorophenyl)-3-methyl-5-pyrazolone, 1-(2,5-dichlorophenyl)-3-methyl-5-pyrazolone, 1-p-tolyl-3-ethyl-5-pyrazolone, 1-(3-sulphamoylphenyl)-3-methyl-5-pyrazolone, 1-(2-sulphophenyl)-3-methyl-5-pyrazolone, 1-(3-sulphophenyl)-3-methyl-5-pyrazolone, 1-(6-chloro-3-sulphophenyl)-3-methyl-5-pyrazolone, 1-(3-sulphophenyl)-5-amino-3-methylpyrazolone, 1-(4-sulphophenyl)-3-methyl-5-pyrazolone, 1-(2-chloro-4-sulphophenyl)-3-methyl-5-pyrazolone, 1-(2,5-dichloro-4-sulphophenyl)-3-methyl-5-pyrazolone, 1-(6-chloro-4-sulphone-2-methylphenyl)-3-methyl-5-pyrazolone, 1-(6-chloro-4-sulpho-2-ethylphenyl)-5-amino-3-methylpyrazole, 1-(2-sulphophenyl)-5-amino-3-methylpyrazole, 1-(3-sulphophenyl)-5-amino-3-ethylpyrazole, 1-(4-sulphophenyl)-5-amino-3-methylpyrazole, 1-phenyl-3-methyl-5-aminopyrazole, 1-(2-sulphophenyl)-3- phenyl-5-pyrazolone, 1-phenyl-3-phenyl-5-pyrazolone, 1-(3-sulphophenyl)-3-(4-nitrophenyl)-5-pyrazolone, 1-phenyl-5-pyrazolone-3-carboxylic acid ethyl ester, 1-phenyl-5-pyrazolone-3-carboxylic acid amide, 1-(6-chloro-4-sulpho-2-methylphenyl)-5-pyrazolone-3-carboxylic acid ethyl ester, 1,4-dimethyl-5-cyano-2,6-pyridione, 1-propyl-4-methyl-5-cyano-2,6-pyridione, 1-butyl-4-ethyl-5-carbamoyl-2,6-pyridione, 1-ethyl-4-methyl-5-carbethoxy-2,6-pyridione, 1-methyl-4,5-dicarbomethoxy-2,6-pyridione and 1-propyl-4,6-dihydroxy-pyridione-2-pyridione.

The dyestuffs according to the invention are suitable for dyeing natural and synthetic fibre materials, particularly for dyeing polyamide in level violet to blue-green shades of good yield and good fastness properties in use. They are absorbed well on polyamide even in a neutral to weakly acid dyebath. By polyamide fibres there are here especially to be understood fibres of synthetic polyamides such as ε-polycaprolactam or condensation products of adipic acid and hexamethylenediamine.

EXAMPLE 1

4.7 g of 2,6-dichloroaniline are stirred into 200 ml of glacial acetic acid and 20 ml of concentrated hydrochloric acid, the mixture is cooled to 0° C. and a solution of 2 g of $NaNO_2$ in 20 ml of $H_2O$ is added dropwise. After about 2 hours, the diazonium salt solution is added slowly to a solution of 5.08 g of 2-amino-3-carbethoxythophene and the mixture is buffered to pH 2 with a saturated sodium acetate solution. The resulting dyestuff, of the formula

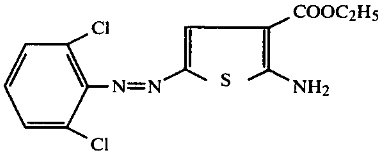

(I)

is filtered off and dried at 40° C.

2.2 g of the dyestuff of the formula (1) are dissolved in 25 ml of 80% strength phosphoric acid and 25 ml of glacial acetic acid. The solution is cooled to 0° C. and 2.6 ml of 45% strength nitrosysulphuric acid are added dropwise. The mixture is stirred for 3 hours at 0° C., the excess nitrosylsulphuric acid is destroyed with urea and 2.3 g of N-ethyl-N-(3-sulphobenzyl)-3-methylaniline dissolved in 40 ml of glacial acetic acid are added. The reaction mixture is then introduced into 350 ml of saturated sodium acetate solution and 100 g of ice. The resulting dyestuff of the formula

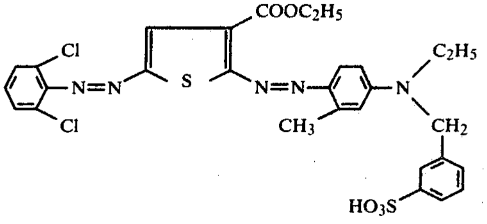

is filtered off and dried at 40° C.

Dyeing example:

0.1 g of the dyestuff from Example 1 is dissolved in 100 ml of hot water, 5 ml of 10% strength ammonium acetate solution are added and the mixture is diluted to a volume of 500 ml with water. 10 g of polyamide fibre are introduced into the dyebath, the latter is brought to the boil over the course of 20 minutes, 4 ml of 10% strength acetic acid are added and the bath is kept at the boil for one hour. The fibres are then rinsed and dried at 70°-80° C. A dyeing in a navy-blue shade, having good fastness properties in use, is obtained.

EXAMPLE 2

2.94 g of p-sulphanilic acid are dissolved in 30 ml of water and 0.8 g of NaOH and 1 g of $NaNO_2$ are added. 100 g of ice and 10 ml of concentrated hydrochloric acid are then introduced. The mixture is stirred for two hours at 0° C. Thereafter, 2.54 g of 2-amino-3-carbethoxythiophene, dissolved in 100 ml of methanol, are added. The dyestuff which has precipitated, of the formula

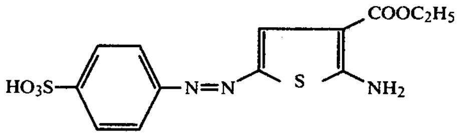

is filtered off and dried at 40° C.

2.5 g of this dyestuff are stirred with 25 ml of phosphoric acid and 25 ml of glacial acetic acid, cooled to 0° C. and diazotised for 3 to 4 hours with 2.6 g of 40% strength nitrosylsulphuric acid. 1 g of urea is then added and 1.4 g of N-ethyl-N-2'-cyanoethyltoluidine dissolved in 30 ml of glacial acetic acid are added. The reaction mixture is introduced into 100 g of ice and 350 ml of concentrated sodium acetate solution. The dyestuff which has precipitated, of the formula

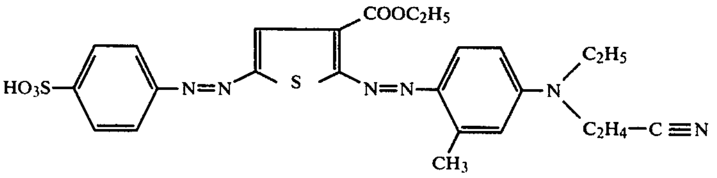

reddish-tinged blue is filtered off and dried at 40° C.

If the procedure in Example 1 and 2 is followed, the amines indicated in column 1 are used as the diazo component, the thiophenes indicated in column 2 are used as the middle component and the compounds indicated in column 3 are used as the coupling component, water-soluble dyestuffs are obtained, which dye polyamide from a weakly acid or neutral bath in violet to blue-green light-fast shades.
Table I
| | I | II | III |
|---|---|---|---|
| 3 | 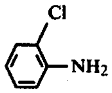 | 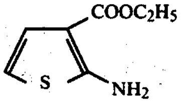 | 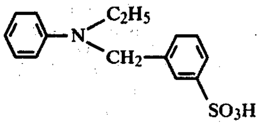 |
| 4 | 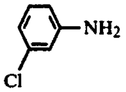 | " | " |
| 5 | 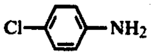 | " | " |
| 6 | 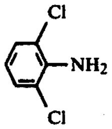 | " | " |
| 7 | 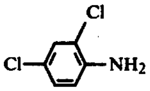 | " | " |
| 8 | 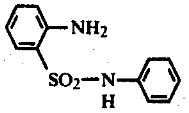 | " | " |
| 9 | 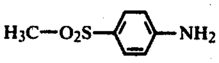 | " | " |
| 10 | 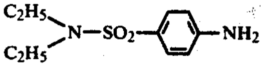 | " | " |
| 11 | 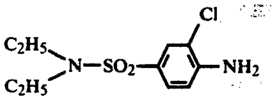 | " | " |
| 12 | 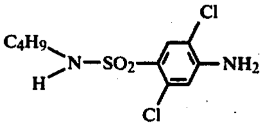 | " | " |
| 13 | 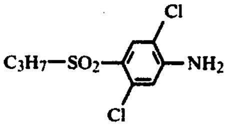 | " | " |
| 14 | 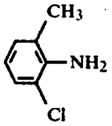 | " | " |
| 15 | 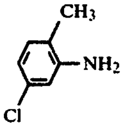 | " | " |
| 16 | 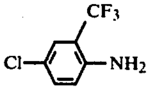 | 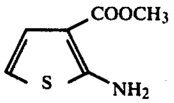 | " |
| 17 | 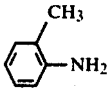 | " | " |
| 18 | 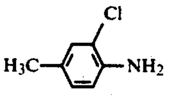 | " | " |

Table I-continued
| | I | II | III |
|---|---|---|---|
| 19 | 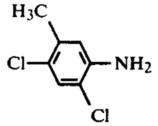 | ″ | |
| 20 | 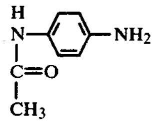 | 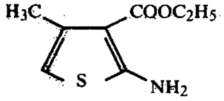 | ″ |
| 21 | 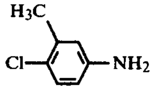 | ″ | 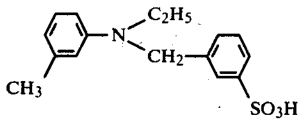 |
| 22 | 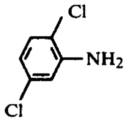 | ″ | ″ |
| 23 | 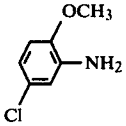 | ″ | ″ |
| 24 | 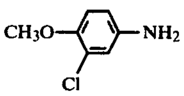 | ″ | 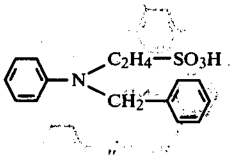 |
| 25 | 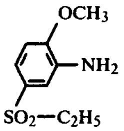 | 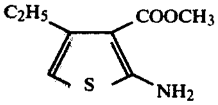 | ″ |
| 26 | 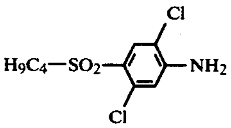 | 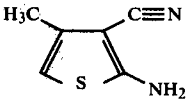 | ″ |
| 27 | 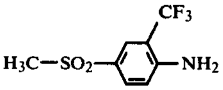 | ″ | ″ |
| 28 | 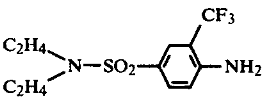 | ″ | ″ |
| 29 | 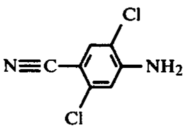 | ″ | ″ |
| 30 | 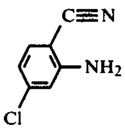 | ″ | ″ |
| 31 | 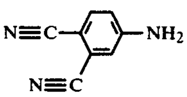 | ″ | ″ |
| 32 | 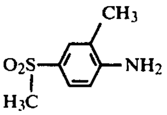 | ″ | ″ |

Table I-continued
| | I | II | III |
|---|---|---|---|
| 33 | 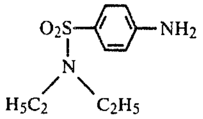 | " | " |
| 34 | 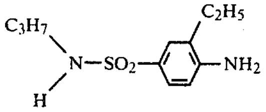 | " | 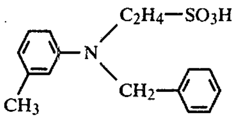 |
| 35 | 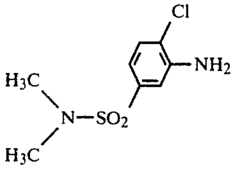 | " | " |
| 36 | 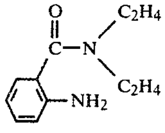 | " | 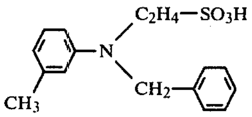 |
| 37 | 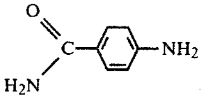 | " | " |
| 38 | 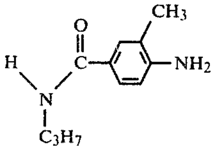 | " | " |
| 39 | 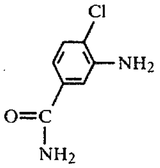 | " | " |
| 40 | 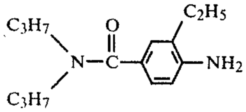 | " | " |
| 41 | 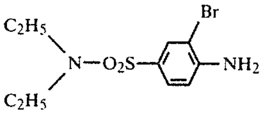 | " | 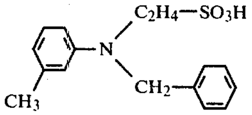 |
| 42 | 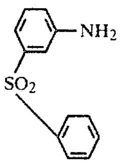 | 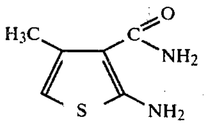 | 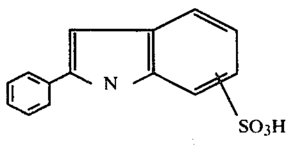 |
| 43 | 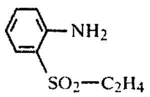 | " | " |
| 44 | 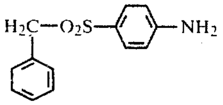 | " | " |

Table I-continued
| | I | II | III |
|---|---|---|---|
| 45 | 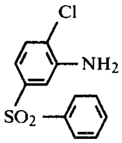 | 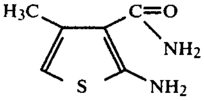 | 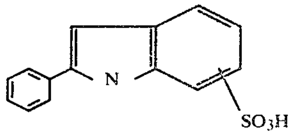 |
| 46 | 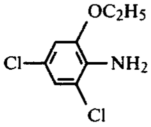 | ″ | ″ |
| 47 | 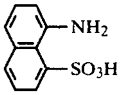 | ″ | 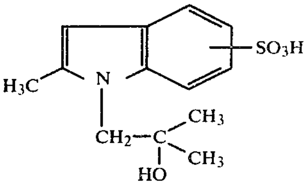 |
| 48 | 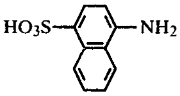 | ″ | 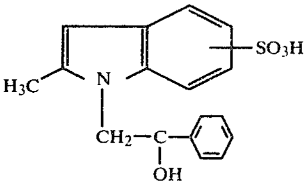 |
| 49 | 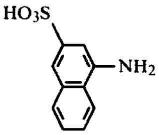 | 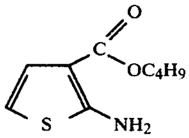 | 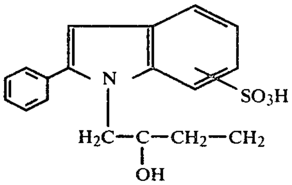 |
| 50 | 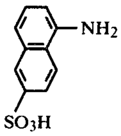 | ″ | 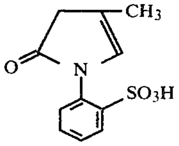 |
| 51 | 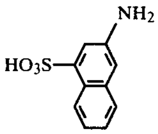 | ″ | 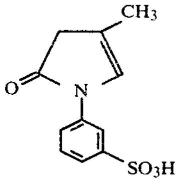 |
| 52 | 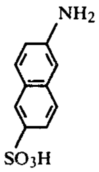 | ″ | 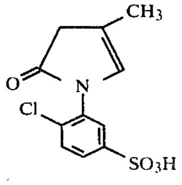 |
| 53 | 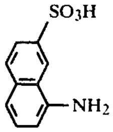 | ″ | 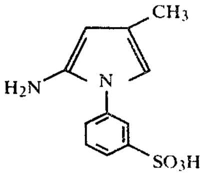 |

Table I-continued
| | I | II | III |
|---|---|---|---|
| 54 | 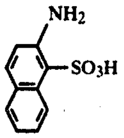 | " | 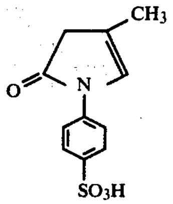 |
| 55 | 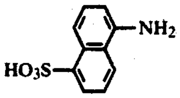 | " | 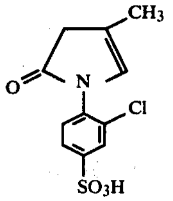 |
| 56 | 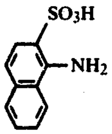 | 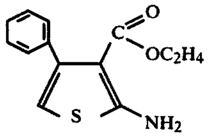 | 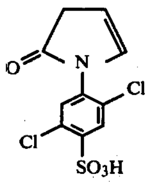 |
| 57 | 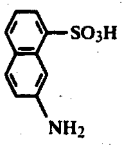 | " | 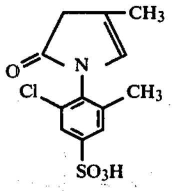 |
| 58 | " | " | 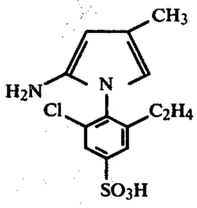 |
| 59 | 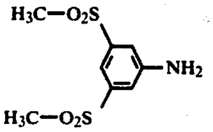 | " | 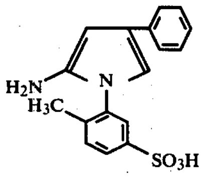 |
| 60 | 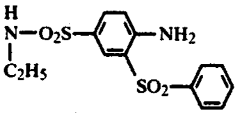 | 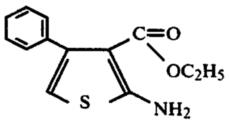 | 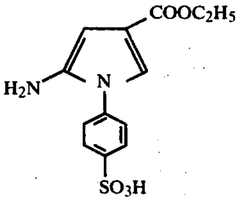 |
| 61 | 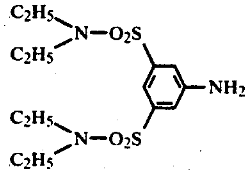 | " | 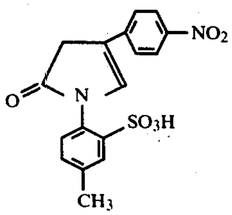 |

Table I-continued
| | I | II | III |
|---|---|---|---|
| 62 | 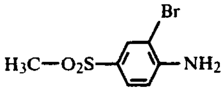 | ″ | 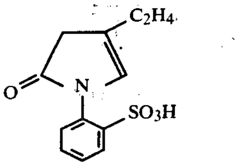 |
| 63 | 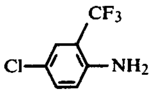 | 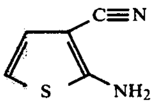 | 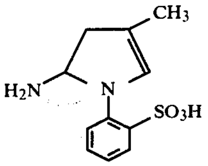 |
| 64 | 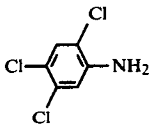 | ″ | 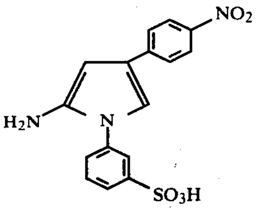 |
| 65 | 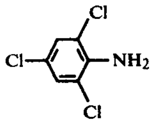 | ″ | 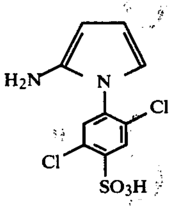 |
| 66 | 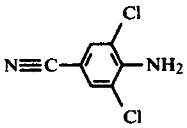 | ″ | 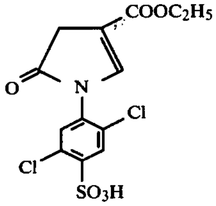 |
| 67 | 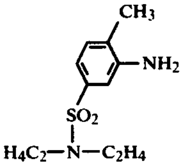 | 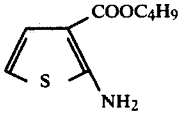 | 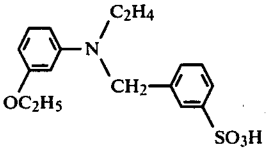 |
| 68 | 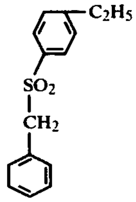 | ″ | 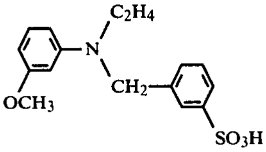 |
| 69 | 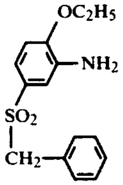 | 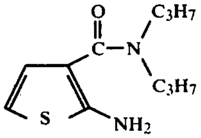 | 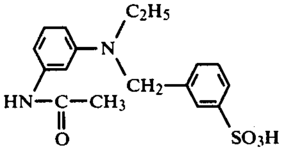 |
| 70 | 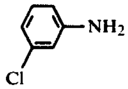 | ″ | 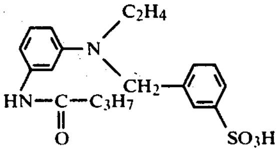 |

Table I-continued
| | I | II | III |
|---|---|---|---|
| 71 | 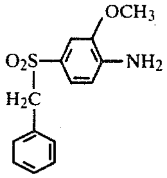 | ″ | 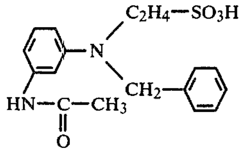 |
| 72 | 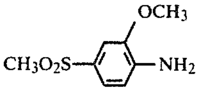 | ″ | 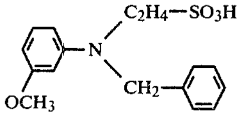 |
| 73 | 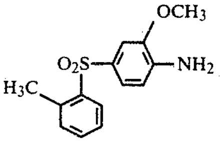 | ″ | 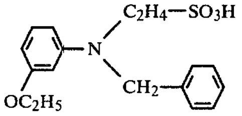 |
| 74 | 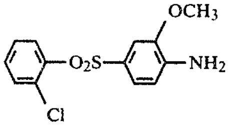 | ″ | 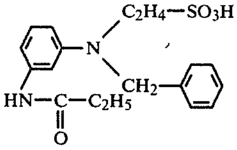 |
| 75 | 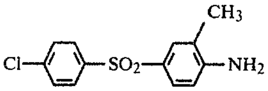 | ″ | 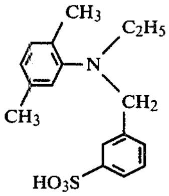 |
| 76 | 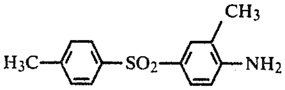 | 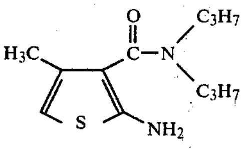 | 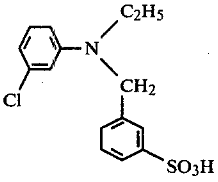 |
| 77 | 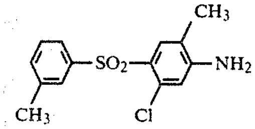 | ″ | ″ |
| 78 | 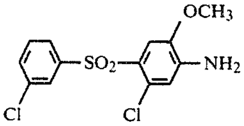 | ″ | 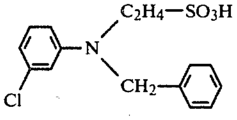 |
| 79 | 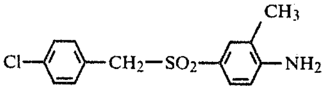 | ″ | 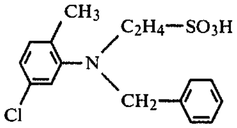 |
| 80 | 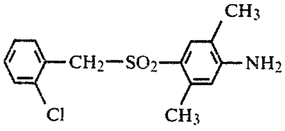 | ″ | 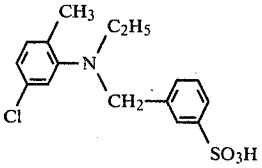 |
| 81 | 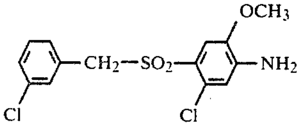 | ″ | 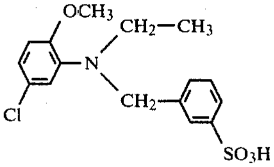 |

Table I-continued
| | I | II | III |
|---|---|---|---|
| 82 | 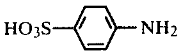 | " | 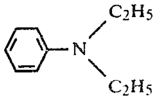 |
| 83 | 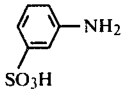 | " | 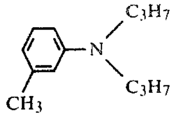 |
| 84 | 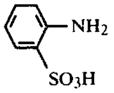 | 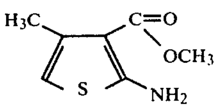 | 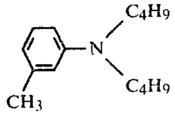 |
| 85 | 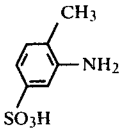 | " | 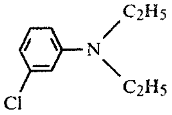 |
| 86 | 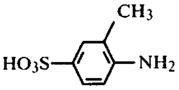 | " | 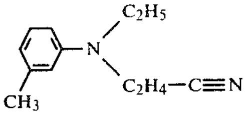 |
| 87 | 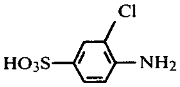 | " | 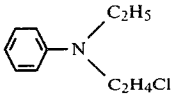 |
| 88 | 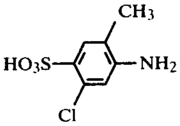 | " | 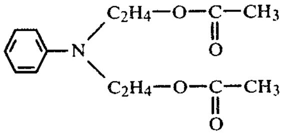 |
| 89 | 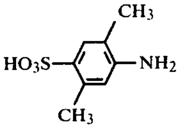 | " | 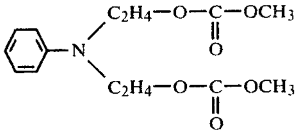 |
| 90 | 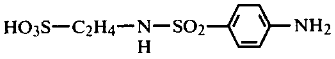 | 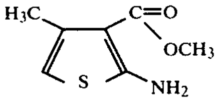 | 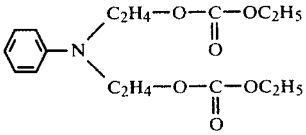 |
| 91 | 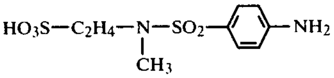 | " | 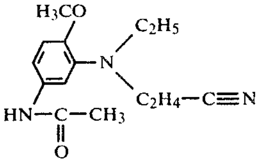 |
| 92 | 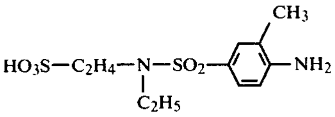 | 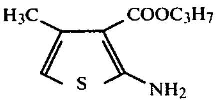 | 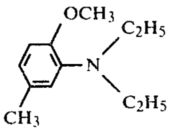 |
| 93 | 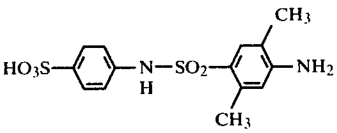 | " | 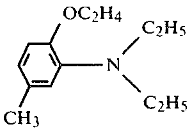 |
| 94 | 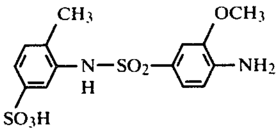 | " | 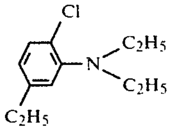 |

Table I-continued
| | I | II | III |
|---|---|---|---|
| 95 | 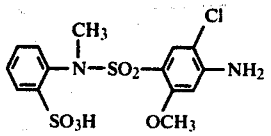 | ″ | 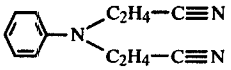 |
| 96 | 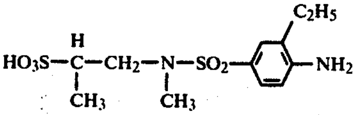 | ″ | 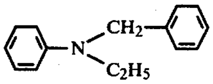 |
| 97 | 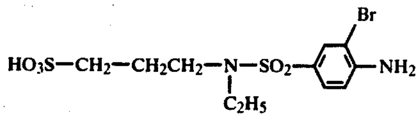 | 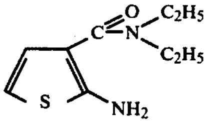 | 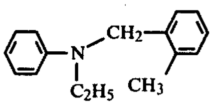 |
| 98 | 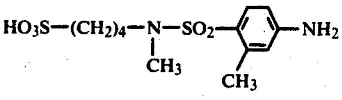 | ″ | 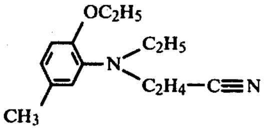 |
| 99 | 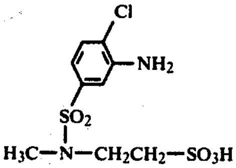 | ″ | 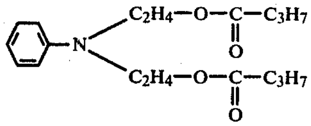 |
| 100 | 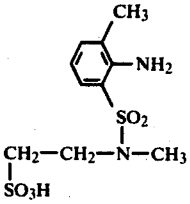 | ″ | 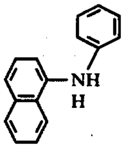 |
| 101 | 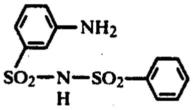 | 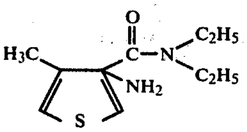 | 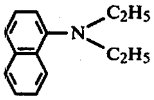 |
| 102 | 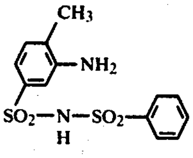 | ″ | 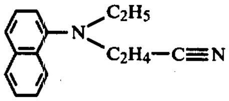 |
| 103 | 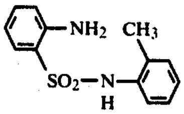 | ″ | 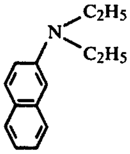 |
| 104 | 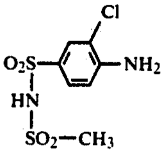 | ″ | 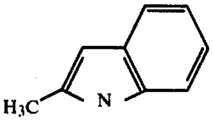 |
| 105 | 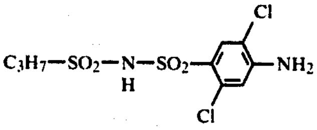 | ″ | 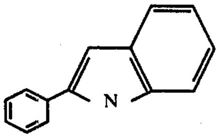 |

Table I-continued
| | I | II | III |
|---|---|---|---|
| 106 | 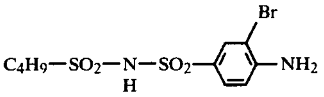 | " | 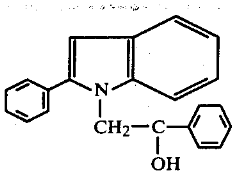 |
| 107 | 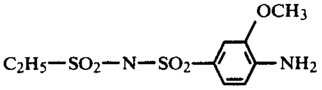 | 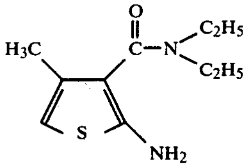 | 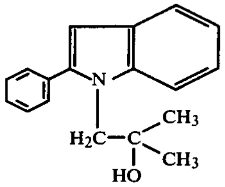 |
| 108 | 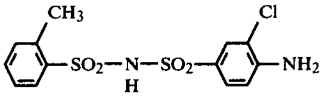 | " | 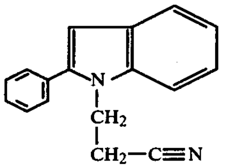 |
| 109 | 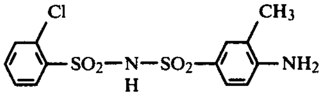 | 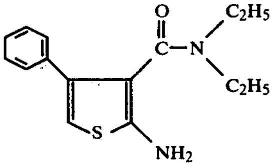 | 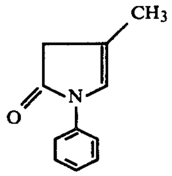 |
| 100 | 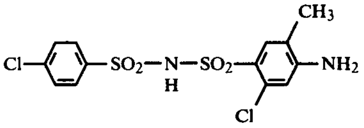 | " | 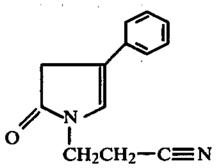 |
| 111 | 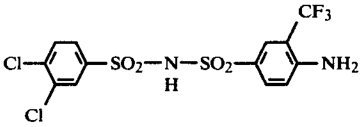 | 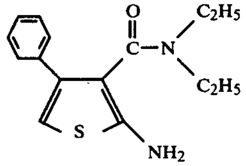 | 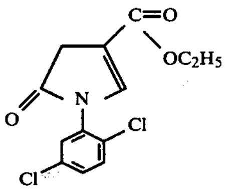 |
| 112 | 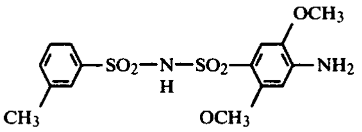 | " | 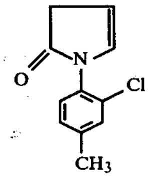 |
| 113 | 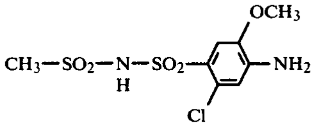 | " | 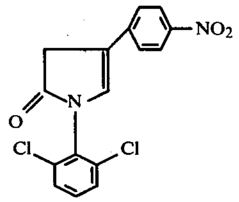 |
| 114 | 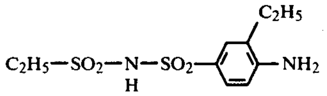 | " | 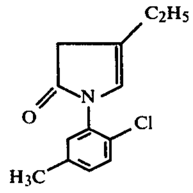 |

Table I-continued
| | I | II | III |
|---|---|---|---|
| 115 | 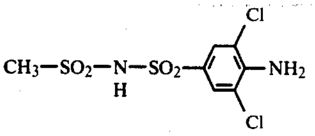 | ″ | 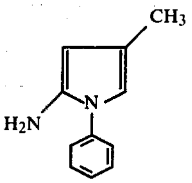 |
| 116 | 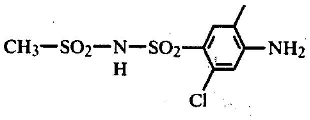 | 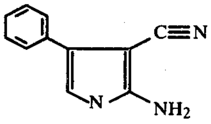 | 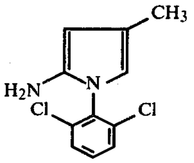 |
| 117 | 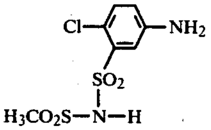 | ″ | 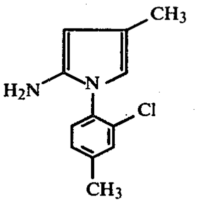 |
| 118 | 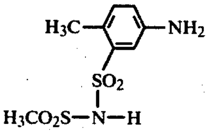 | ″ | 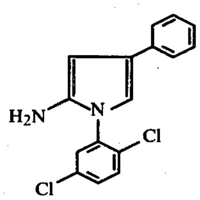 |
| 119 | 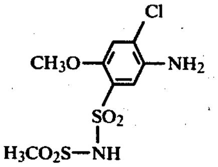 | ″ | 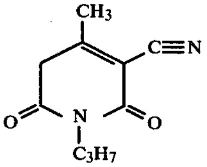 |
| 120 | 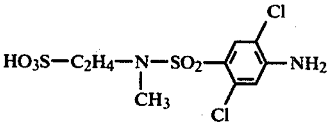 | ″ | 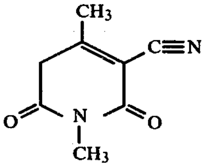 |
| 121 | 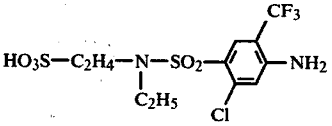 | ″ | 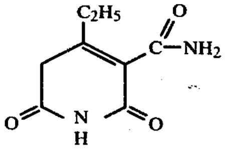 |
| 122 | 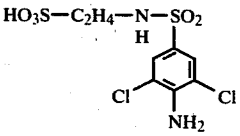 | 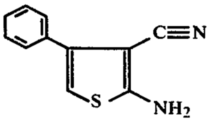 | 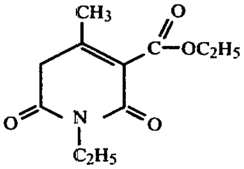 |
| 123 | 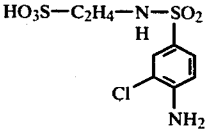 | ″ | 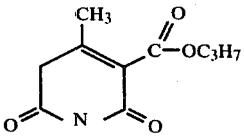 |
| 124 | 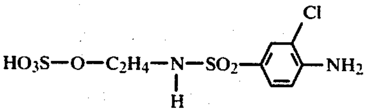 | ″ | 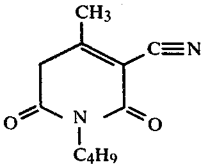 |

Table I-continued
| | I | II | III |
|---|---|---|---|
| 125 | 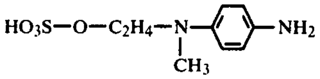 | ″ | 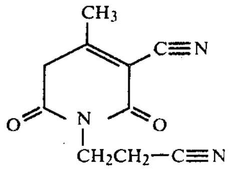 |
| 126 | 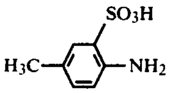 | 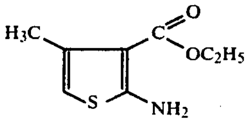 | 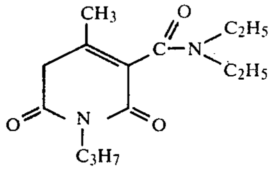 |
| 127 | 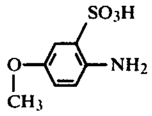 | ″ | 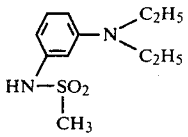 |
| 128 | 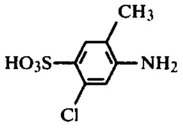 | ″ | 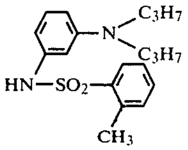 |
| 129 | 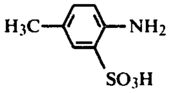 | ″ | 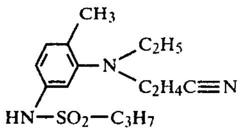 |
| 130 | 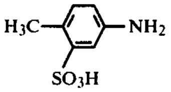 | ″ | 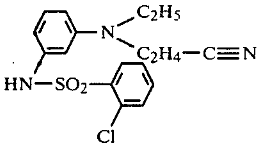 |
| 131 | 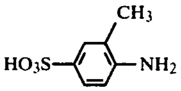 | ″ | 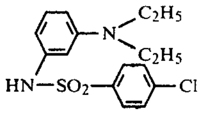 |
| 132 | 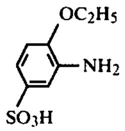 | ″ | 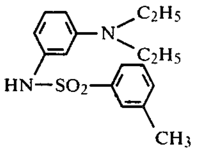 |
| 133 | 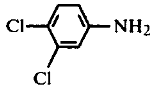 | ″ | 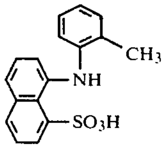 |
| 134 | 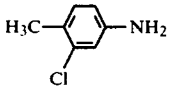 | ″ | 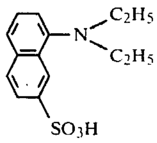 |
| 135 | 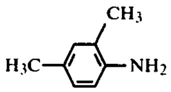 | ″ | 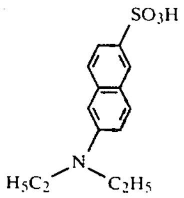 |

Table I-continued
| | I | II | III |
|---|---|---|---|
| 136 | 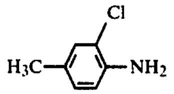 | 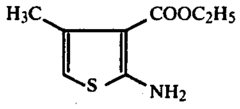 | 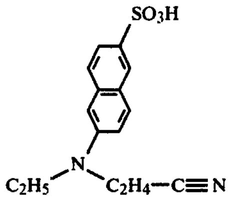 |
| 137 | 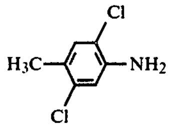 | " | 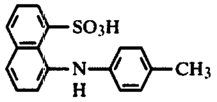 |
| 138 | 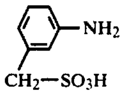 | " | 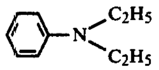 |
| 139 | 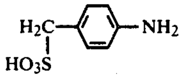 | " | 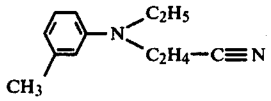 |
| 140 | 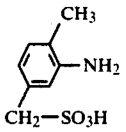 | " | " |
| 141 | 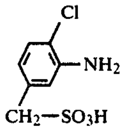 | " | " |
| 142 | 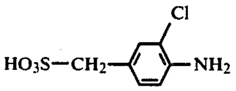 | " | " |
| 143 | 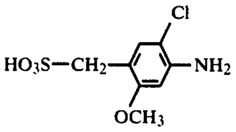 | 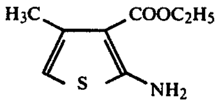 | " |
| 144 | 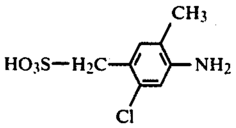 | 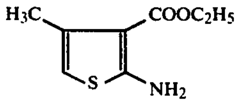 | " |
| 145 | " | " | 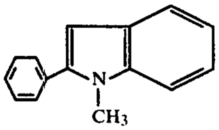 |
| 146 | 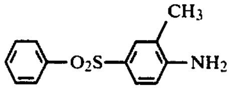 | " | 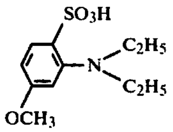 |
| 147 | 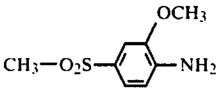 | " | 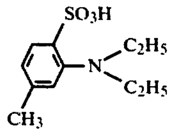 |

Table I-continued
| | I | II | III |
|---|---|---|---|
| 148 | 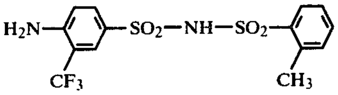 | 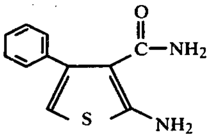 | 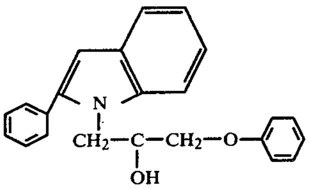 |
| 149 | 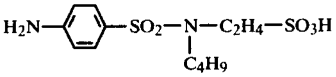 | 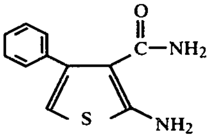 | 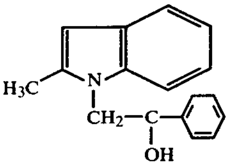 |
| 150 | 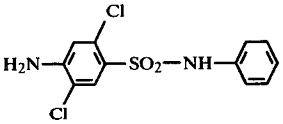 | ″ | 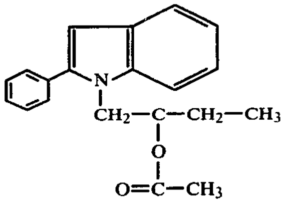 |
| 151 | 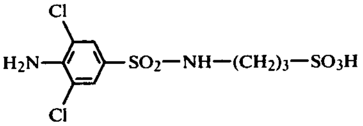 | 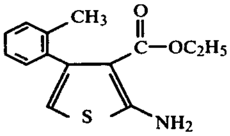 | 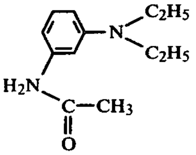 |
| 152 | 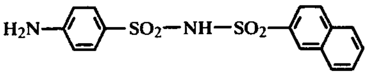 | ″ | 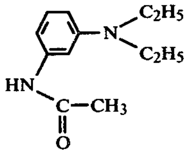 |
| 153 | 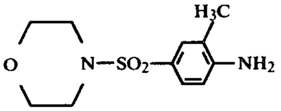 | 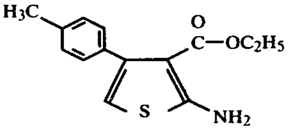 | 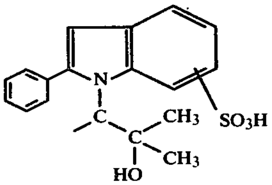 |
| 154 | 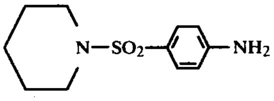 | 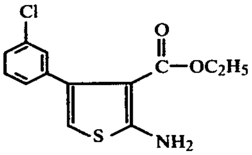 | 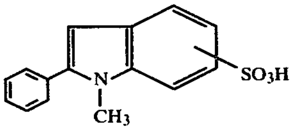 |
| 155 | 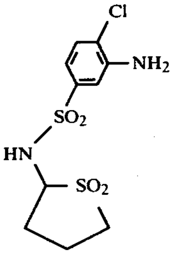 | 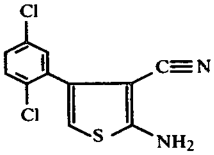 | 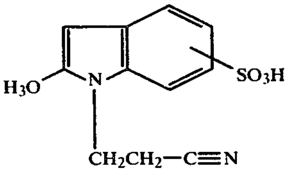 |
| 156 | 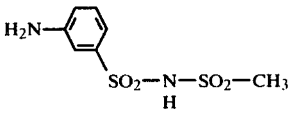 | 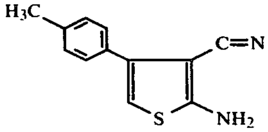 | 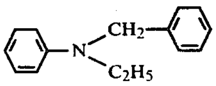 |

Table I-continued
| | I | II | III |
|---|---|---|---|
| 157 | 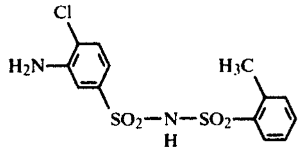 | 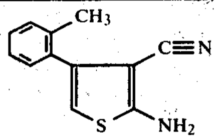 | 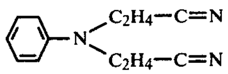 |
| 158 | 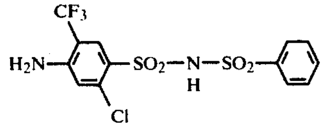 | 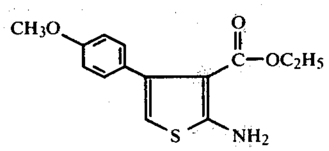 | 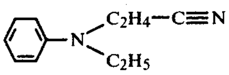 |
| 159 | 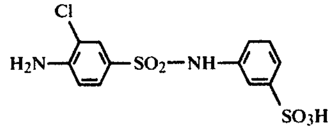 | 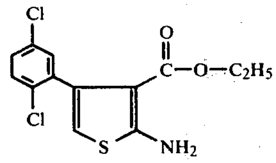 | ″ |
| 160 | 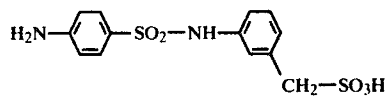 | 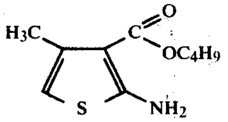 | 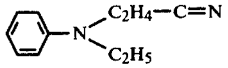 |
| 161 | 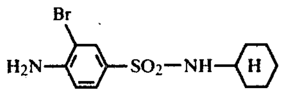 | ″ | 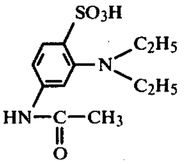 |
| 162 | 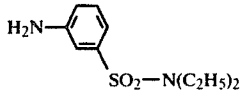 | ″ | ″ |
| 163 | 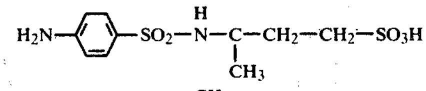 | ″ | 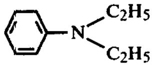 |
| 164 | 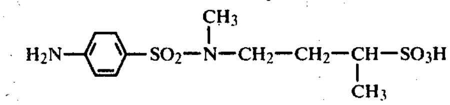 | 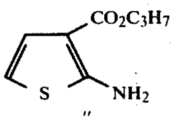 | 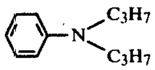 |
| 165 | 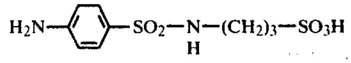 | ″ | ″ |
| 166 | 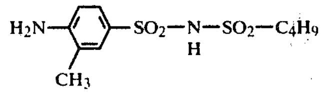 | 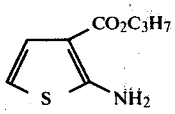 | 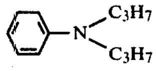 |
| 167 | 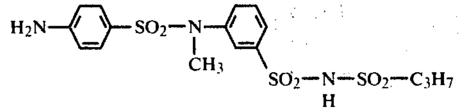 | ″ | 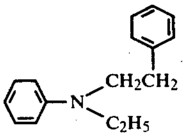 |
| 168 | 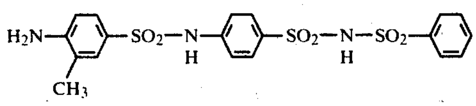 | ″ | 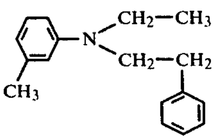 |
| 169 | 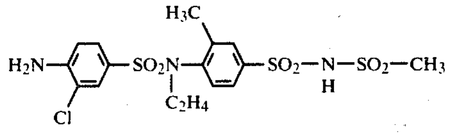 | ″ | 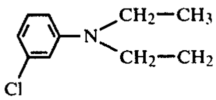 |
| 170 | 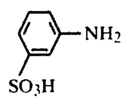 | 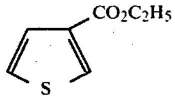 | 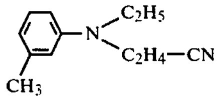 |

Table I-continued

| | I | II | III |
|---|---|---|---|
| 171 | " | 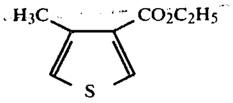 | " |
| 172 | 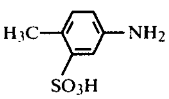 | " | " |
| 173 | 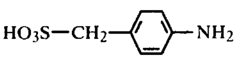 | " | 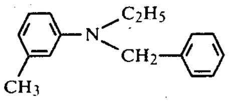 |
| 174 | " | 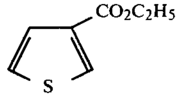 | " |
| 175 | " | 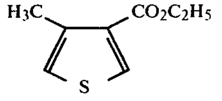 | 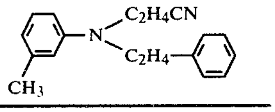 |

We claim:

1. Acid disazo dyestuff of the formula

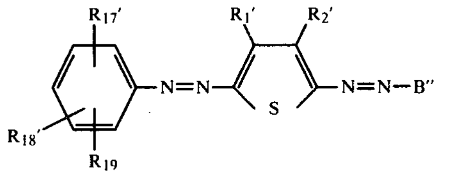

wherein $R_1'$ represents hydrogen, methyl, ethyl, carbo-$C_1$-$C_4$-alkoxy, phenyl, or phenyl substituted by Cl or $NO_2$;

$R_2'$ represents carbo-$C_1$-$C_4$-alkoxy, cyano, $CONH_2$, CON $(CH_3)_2$ or CON $(C_2H_5)_2$;

$R_{17}'$ and $R_{18}'$ represent hydrogen; chlorine; bromine; cyano; $C_1$-$C_2$-alkyl; $C_1$-$C_2$-alkoxy; $C_2$-$C_4$-carboalkoxy; carbamoyl; carbamoyl mono- or di-substituted by $C_1$-$C_3$-alkyl; sulphamoyl; sulphamoyl mono- or disubstituted by $C_1$-$C_3$-alkyl; $C_1$-$C_4$-alkylsulphonyl; phenylsulphonyl; or benzylsulphonyl;

$R_{19}$ represents hydrogen, $C_1$-$C_4$-alkyl, $CF_3$, Cl, or Br;

B" is a radical of a coupling component selected from the group consisting of:

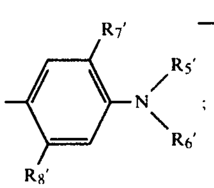

;

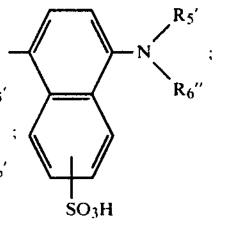

;

-continued

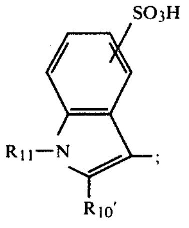

;

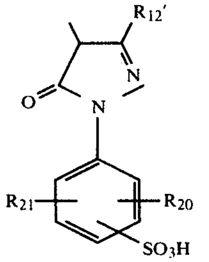

; and

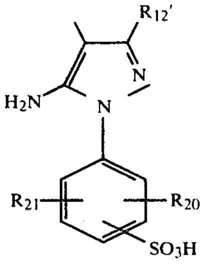

;

wherein $R_5'$ represents hydrogen, $C_1$-$C_4$-alkyl, or benzyl;

$R_6'$ represents $C_1$-$C_4$-alkyl, $CH_2$—$CH_2$—$SO_3H$, or 3-sulphobenzyl;

$R_6''$ represents hydrogen, $C_1$-$C_4$-alkyl, benzyl, or 2-phenylethyl;

$R_7'$ represents hydrogen, $C_1$-$C_4$-alkyl, $C_1$-$C_4$-alkoxy, halogen, or $C_1$-$C_4$-alkylsulphonyl;

$R_8'$ represents hydrogen, $CH_3$, $C_2H_5$, $OCH_3$, $OC_2H_5$, Cl, or NH—CO—$(CH_2)_n$—H with n=1, 2 or 3, $R_{10}'$ represents methyl, ethyl or phenyl;

$R_{11}$ represents hydrogen; $C_1$-$C_4$-alkyl; or $C_1$-$C_4$-alkyl substituted by halogen, cyano, hydroxyl, or $C_1$-$C_4$-alkoxy;

$R_{12}'$ represents hydrogen, methyl, phenyl, carbomethoxy or carboethoxy; and $R_{20}$ and $R_{21}$ represent hydrogen, $C_1$-$C_4$-alkyl, Cl, or Br.

2. Acid dyestuff of claim 1 of the formula

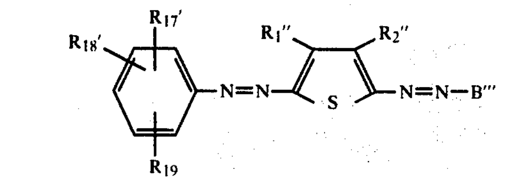

wherein $R_1''$ denotes hydrogen, methyl or phenyl;

$R_2''$ denotes carbomethoxy, carboethoxy, cyano or $CONH_2$

B''' is the radical of a coupling component selected from the group consisting of:

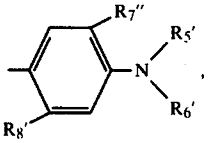 , 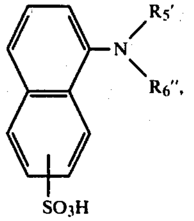

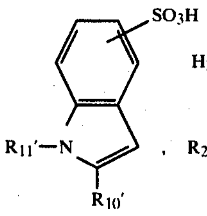 , 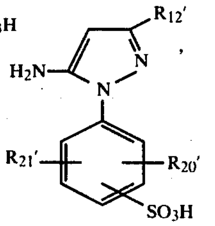 , and 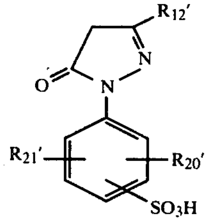

wherein $R_5'$, $R_6'$, $R_6''$, $R_8'$, $R_{10}'$, $R_{12}'$ have the definition given in claim 1;

$R_7''$ represents hydrogen, methoxy, ethoxy, or methylsulphonyl;

$R_{11}'$ represents hydrogen or methyl; and $R_{20}'$ and $R_{21}'$ represent hydrogen, methyl or chlorine.

3. Acid dyestuff of claim 1 of the formula

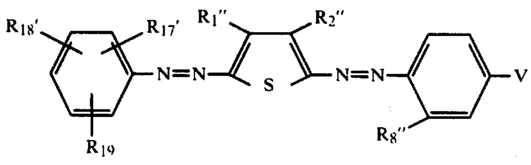

wherein $R_{17}'$, $R_{18}'$ and $R_{19}$ have the definition indicated in claim 1;

$R_1''$ denotes hydrogen, methyl or phenyl;

$R_2''$ denotes carbomethoxy, carboethoxy, cyano or $CONH_2$;

$R_8''$ denotes hydrogen, methyl, methoxy, or acetylamino; and

V represents

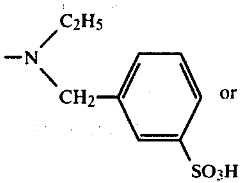 or 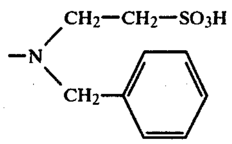

4. Acid dyestuff of the formula

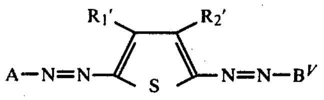

wherein A represents

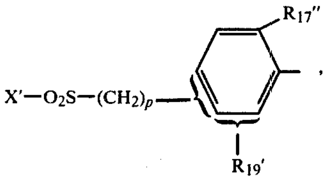 , or 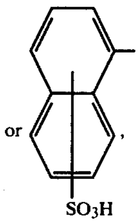 , $B^V$ is a radical of a coupling component selected from the group consisting of:

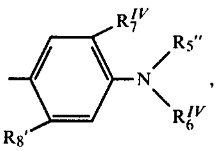 , 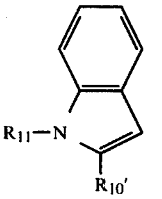 , 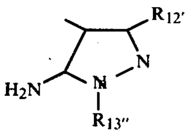

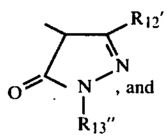 , and 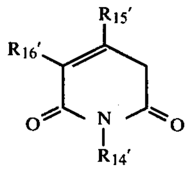 ;

wherein $R_1'$ represents hydrogen, methyl, ethyl, carbo-$C_1$-$C_4$-alkoxy, phenyl, or phenyl substituted by Cl or $NO_2$;

$R_2'$ represents carbo-$C_1$-$C_4$-alkoxy, CN, $CONH_2$, $CON(CH_3)_2$, or $CON(C_2H_5)_2$;

R'' and $R_6IV$ represent hydrogen; benzyl; 2-phenylethyl; $C_1$-$C_4$-alkyl; or $C_1$-$C_4$-alkyl substituted by Cl, CN, $O-CO-(CH_2)_n-H$, or $OCO-O(CH_2)_nH$ with $n=1$, 2 or 3;

$R_7IV$ represents hydrogen, methyl, ethyl, methoxy, or ethoxy;

$R_8'$ represents H, $CH_3$, $C_2H_5$, $OCH_3$, $OC_2H_5$, Cl or $-NH-CO-(CH_2)_n-H$ with $n=1$, 2 or 3;

$R_{10}'$ represents $CH_3$, $C_2H_5$, or phenyl;

$R_{11}$ represents hydrogen; $C_1$-$C_4$-alkyl; or $C_1$-$C_4$-alkyl substituted by halogen, cyano, hydroxyl or $C_1$-$C_4$-alkoxy;

$R_{12}'$ represents hydrogen, methyl, phenyl, carbomethoxy, or carboethoxy, $R_{13}''$ represents hydrogen, $C_1$-$C_4$-alkyl, phenyl, or phenyl mono- or disubstituted by $CH_3$ or Cl;

$R_{14}'$ and $R_{15}'$ represent $C_1$-$C_4$-alkyl;

$R_{16}'$ represents CN, $CONH_2$, or CO—O—$(CH_2)_mH$ with m=1, 2, 3 or 4;

$R_{17}''$ and $R_{19}'$ represent hydrogen, methyl, ethyl, chlorine, bromine, or $CF_3$;

p represents 0 or 1;

X′ represents OH, NH—$SO_2R_3'$,

N—$C_2$—$C_4$-alkylene-$SO_3H$,
|
$R_4'$ or

N-phenylene-$SO_3H$;
|
$R_4'$ $R_3'$ represents $C_1$-$C_4$-alkyl, tolyl, or chlorophenyl; and $R_4'$ represents hydrogen, methyl, or ethyl.

5. Acid dyestuffs of claim 4 of the formula

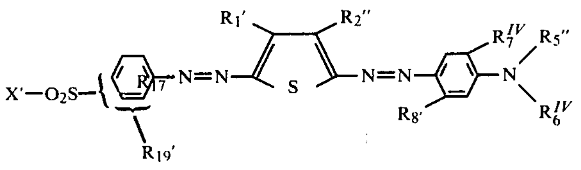

wherein $R_1''$ represents H, $CH_3$, or phenyl;

$R_2''$ represents $COOCH_3$, $COOC_2H_5$, CN, or $CONH_2$; and

X′, $R_5''$, $R_6^{IV}$, $R_7^{IV}$, $R_8'$, $R_{17}''$ and $R_{19}'$ have the meaning indicated in claim 4.

* * * * *